(12) United States Patent
Mitomi

(10) Patent No.: US 7,930,810 B2
(45) Date of Patent: Apr. 26, 2011

(54) RIVET FASTENING AIR TOOL

(75) Inventor: Katsuhiro Mitomi, Yokohama (JP)

(73) Assignee: Nifco Inc., Yokohama-Shi, Kanagawa-Ken (JP)

( * ) Notice: Subject to any disclaimer, the term of this patent is extended or adjusted under 35 U.S.C. 154(b) by 298 days.

(21) Appl. No.: 12/285,430

(22) Filed: Oct. 6, 2008

(65) Prior Publication Data
US 2009/0321494 A1   Dec. 31, 2009

(30) Foreign Application Priority Data

Jun. 25, 2008  (JP) ................................. 2008-165487
Jun. 25, 2008  (JP) ................................. 2008-165493
Jun. 25, 2008  (JP) ................................. 2008-165504

(51) Int. Cl.
  *B21J 15/22*  (2006.01)
  *B21D 31/00*  (2006.01)
(52) U.S. Cl. ............... 29/243.525; 29/243.53; 29/812.5; 72/391.4; 72/391.6; 227/57
(58) Field of Classification Search ............. 29/243.525, 29/243.523, 243.53, 524.1, 525.06, 525.07, 29/709, 715, 812.5; 72/391.4, 391.6; 227/57, 227/112
See application file for complete search history.

(56) References Cited

U.S. PATENT DOCUMENTS

| 4,744,238 | A | * | 5/1988 | Halbert ........................ 29/812.5 |
| 5,327,639 | A | * | 7/1994 | Wing et al. ..................... 29/709 |
| 5,544,407 | A | * | 8/1996 | Ohuchi et al. ............. 29/525.06 |
| 5,651,169 | A | * | 7/1997 | Ohuchi et al. ........... 29/243.525 |
| 6,098,442 | A | * | 8/2000 | Walldorf et al. ............. 72/391.6 |
| 6,519,997 | B2 | * | 2/2003 | Luhm et al. .................. 72/391.6 |
| 7,159,291 | B2 | * | 1/2007 | Ohuchi .................... 29/243.525 |

FOREIGN PATENT DOCUMENTS

JP   H06-047475   2/1994

* cited by examiner

*Primary Examiner* — David B Jones
(74) *Attorney, Agent, or Firm* — Manabu Kanesaka

(57) ABSTRACT

A rivet fastening air tool for rivets includes a supplying actuator, an implanting actuator, and a switching valve. The supply actuator receives a rivet row, tears off a fragile portion of a front-row rivet, and supplies it in a loaded position. The implanting actuator retains a head portion of the rivet supplied in the loaded position, and moves the rivet in a direction of being pulled out of a communicating bore of the rivet. The switching valve is provided in an air supply route which reaches the supplying actuator. When the head portion of the rivet is moved in the direction of being pulled out, the switching valve is switched by the implanting actuator so that the supplying actuator is returned.

14 Claims, 26 Drawing Sheets

RIVET FASTENING AIR TOOL

BACKGROUND OF THE INVENTION AND RELATED ART STATEMENT

The invention relates to a rivet fastening air tool, and by associating a rivet supplying actuator with a rivet implanting actuator through a switching valve, the structure can be simple with fewer components and downsized.

Conventionally, a rivet fastening tool, which is controlled with two systems using an air pressure for a supplying operation of the rivet supplying actuator, and using a spring operation for the returning operation thereof, is well-known. (For example, refer to paragraphs [0055], [0058], FIGS. 1 and 10) of Japanese Patent Publication (TOKKAI) No. H06-47475).

However, in the above-mentioned conventional rivet fastening tool, the supplying operation of the rivet supplying actuator and the returning operation thereof are controlled with the two systems, so that there are problems such that the structure is complicated and has many components.

Each invention described in each aspect is made in order to solve the above-mentioned problems in the conventional technology, and the object of the invention is as follows.

The invention in a first aspect has the following object.

Specifically, the invention in the first aspect can have a simple structure with fewer components and be downsized by interlocking the rivet supplying actuator with the rivet implanting actuator through the switching valve.

The invention in a second aspect has the following object in addition to the object of the invention in the first aspect.

Specifically, in the invention of the second aspect, the rivet supplying actuator can be returned to a counter-transfer direction from a transfer direction due to a switching operation of the switching valve.

The invention in a third aspect has the following object in addition to the object of the invention in the first or second aspect.

Specifically, the invention in the third aspect can be downsized further by arranging the switching valve in the approximate middle of the total length of the rivet implanting actuator.

The invention in a fourth aspect has the following object in addition to the object of the invention in any one of the first to third aspects.

Specifically, in the invention of the fourth aspect, remaining rivets can be cut off using an operation of the rivet implanting actuator.

The invention in a fifth aspect has the following object in addition to the object of the invention in any one of the first to fourth aspects.

Specifically, in the invention of the fifth aspect, the remaining rivets can be discharged using the operation of the rivet supplying actuator.

The invention in a sixth aspect has the following object in addition to the object of the invention in any one of the first to fifth aspects.

Specifically, in the invention of the sixth aspect, the most appropriate rivet fastening air tool for a resin rivet can be provided.

Further objects and advantages of the invention will be apparent from the following description of the invention.

SUMMARY OF THE INVENTION

Each invention according to each aspect is made in order to achieve the above-mentioned objects. Hereinafter, features of each invention will be explained with reference to embodiments shown in the following drawings.

Incidentally, symbols in brackets show the symbols used in the embodiments of the present invention, and are not limited to the technical scope of the invention.

Drawing numbers also show the drawing numbers used in the embodiments of the invention, and are not limited to the technical scope of the invention.

The invention in the first aspect has the following features.

First, as shown in FIGS. 21 to 24, rivets (20) comprise the following structure.

(1) Female members (70)
(2) Male members (80)

Secondly, as shown in FIGS. 21 to 25, female members (70) include the following structure.

(3) Base portions (71)
(4) Leg portions (72)

For example, as shown in FIG. 25, leg portions (72) extend from base portions (71); are inserted in an attachment bore (H) which is provided in an attachment side (for example, a panel P); and is bent on the rear face side of the attachment bore (H), so that the diameter of the leg portions 72 can be expanded.

Incidentally, although the panel (P) is shown as an example of the attachment side, it is not limited to the panel (P).

(5) Communicating bore (73)

As shown in FIGS. 23, 24, a communicating bore (73) is communicated from the base portions (71) to the leg portions (72).

Third, for example, as shown in FIGS. 21 to 25, male members (80) include the following structure.

(6) Head portions (81)
(7) Shaft portions (82)

For example, as shown in FIGS. 23 to 25, shaft portions (82) extend from head portions (81) and are inserted into the communicating bore (73) to be able to be pulled out. The shaft portions (82) open the leg portions (72) by moving the shaft portions (82) in a direction of being pulled out of the communicating bore (73).

Fourth, for example, as shown in FIG. 21, adjacent head portions (81) are connected through fragile portions (83) in such a way that the leg portions (72) face the same direction, so that a rivet row (60) is formed by connecting multiple rivets (20) as a series.

Fifth, for example, as shown in FIG. 1, a rivet fastening air tool (10) includes the following structure.

(8) Supplying actuator (180)

A supplying actuator (180) loads the rivet row (60); tears off the fragile portion (83) of the very front-row rivet (20); and supplies it in a loaded position (A).

(9) Implanting actuator (100)

An implanting actuator (100) retains the head portions (81) of the rivets (20) supplied in the loaded position (A), and moves them in the direction of being pulled out of the communicating bore (73).

Sixth, for example, as shown in FIG. 1, a switching valve (120) is provided in an air supply route which reaches the supplying actuator (180).

Seventh, for example, as shown in FIG. 14, when the head portions (81) of the rivets (20) are moved in the direction of being pulled out, the switching valve (120) is switched by the implanting actuator (100), so that the supplying actuator (180) is returned.

The invention in the second aspect includes the following features in addition to the features of the invention in the first aspect.

Specifically, the supplying actuator (180) is usually urged in a transfer direction, and returned in a counter-transfer direction by a switching operation of the switching valve (120).

The invention in the third aspect includes the following features in addition to the features of the invention in the first or second aspect.

Specifically, the switching valve (120) is provided in the approximate middle of the total length of the implanting actuator (100) (not shown).

The invention in the fourth aspect includes the following features in addition to the features of the invention in any one of the first to third aspects.

First, for example, as shown in FIGS. 4 to 10, the loaded position (A) has the following structure.

(1) Cutter device (110)

In an open position, pieces of a cutter device (110) are distantly opposed to each other; sandwich the shaft portions (82) within an opposed interval; cut off the shaft portions (82) in a closed position; and separate the shaft portions (82) from the head portions (81).

Secondly, for example, as shown in FIG. 1, the implanting actuator (100) has the following structure.

(2) Main cylinder (101)

(3) Outer piston (102)

An outer piston (102) is housed inside a main cylinder (101) to be slidable.

(4) Inner piston (103)

An inner piston (103) is housed inside the outer piston (102) to be slidable.

(5) Main shaft (90)

A main shaft (90) is fixed to the inner piston (103), and retains the head portions (81).

(6) Slide cam (104)

A slide cam (104) is connected to the outer piston (102); usually retains the cutter device (110) in the open position; and moves the cutter device (110) in the closed position by sliding the outer piston (102).

The invention in the fifth aspect includes the following features in addition to the features of the invention in any one of the first to fourth aspects Specifically, a remaining portion (21) of the rivet (20) which was cut off by the cutter device (110) is transferred to the loaded position (A) of the very front-row rivet (20) after the supplying actuator (180) is returned (not shown), so that due to the transferred rivet (20), the remaining portion (21) of the rivet (20) which was cut off by the cutter device (110) is pushed into a discharge passage communicated with the loaded position (A).

The invention in the sixth aspect has the following features in addition to the features of the invention in any one of the first to fifth aspects.

Specifically, the rivet (20) is made of resin.

The present invention is structured as described above, so that the following effects can be obtained.

According to the invention in the first aspect, the following effects can be obtained.

Specifically, according to the invention in the first aspect, the rivet supplying actuator and the rivet implanting actuator are interlocked through the switching valve, so that the structure can be simple with fewer components, and downsized.

According to the invention in the second aspect, in addition to the effects of the invention in the first aspect, the following effect can be obtained.

Specifically, according to the invention in the second aspect, due to a switching operation of the switching valve, the rivet supplying actuator can be returned to the counter-transfer direction from the transfer direction.

According to the invention in the third aspect, in addition to the effects of the invention in the first or second aspect, the following effect can be obtained.

Specifically, according to the invention in the third aspect, the switching valve is provided in the approximate middle of the total length of the rivet implanting actuator, so that further downsizing can be possible.

According to the invention in the fourth aspect, in addition to the effects of the invention in any one of the first to third aspects, the following effect can be obtained.

Specifically, according to the invention in the fourth aspect, the remaining rivet can be cut off using the operation of the rivet implanting actuator.

According to the invention in the fifth aspect, in addition to the effects of the invention in any one of the first to fourth aspects, the following effect can be obtained.

Specifically, according to the invention in the fifth aspect, the remaining rivet can be discharged using the operation of the rivet supplying actuator.

According to the invention in the sixth aspect, in addition to the effects of the invention in any one of the first to fifth aspects, the following effect can be obtained.

Specifically, according to the invention in the sixth aspect, the rivet fastening air tool which is most appropriate for a resin rivet can be provided.

DETAILED DESCRIPTION OF PREFERRED EMBODIMENTS

FIGS. 1 to 28 respectively show an example of embodiments of the present invention.

Figure 1:
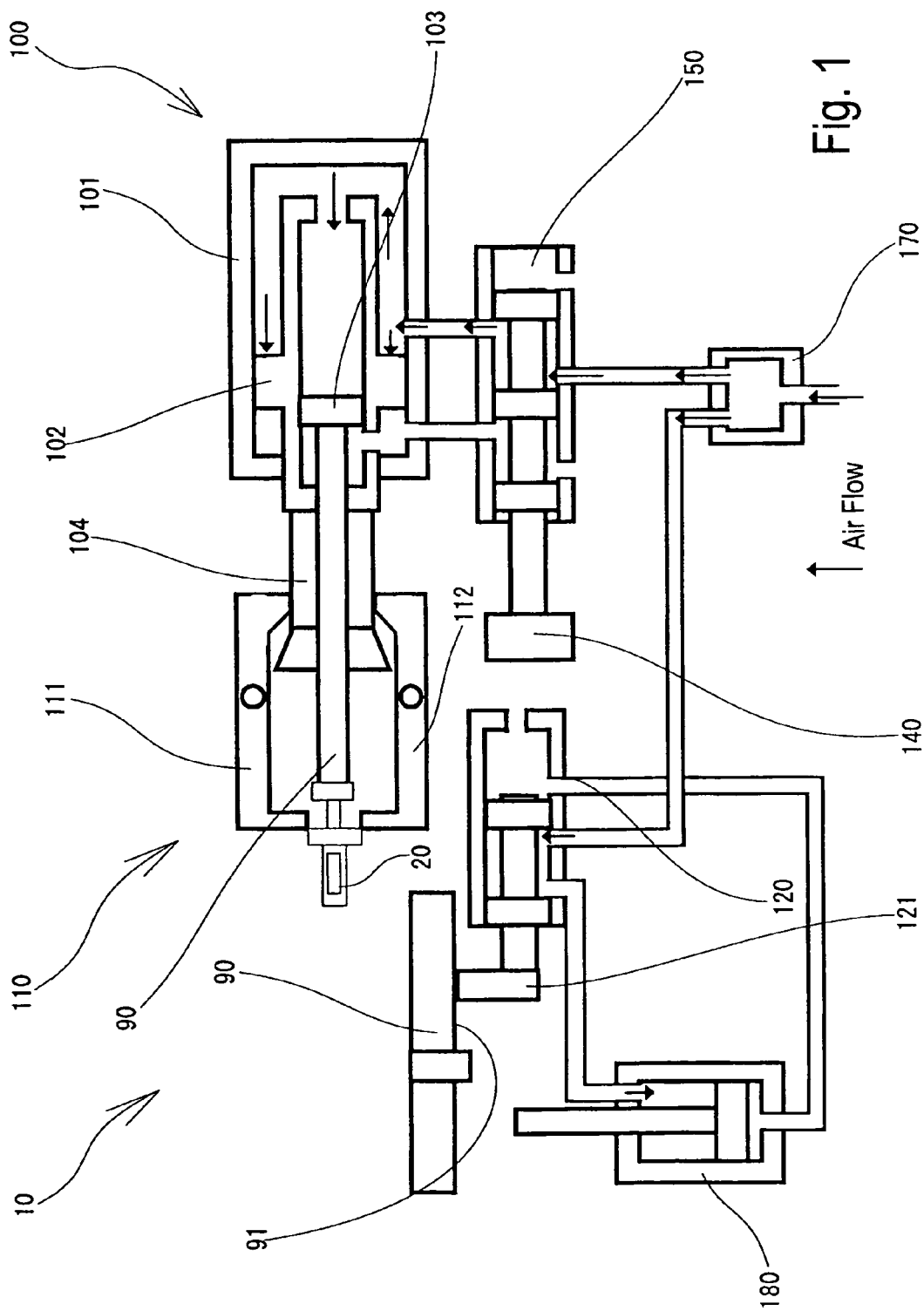
FIG. 1 is a pneumatic circuit diagram of an air tool.
Figure 2:
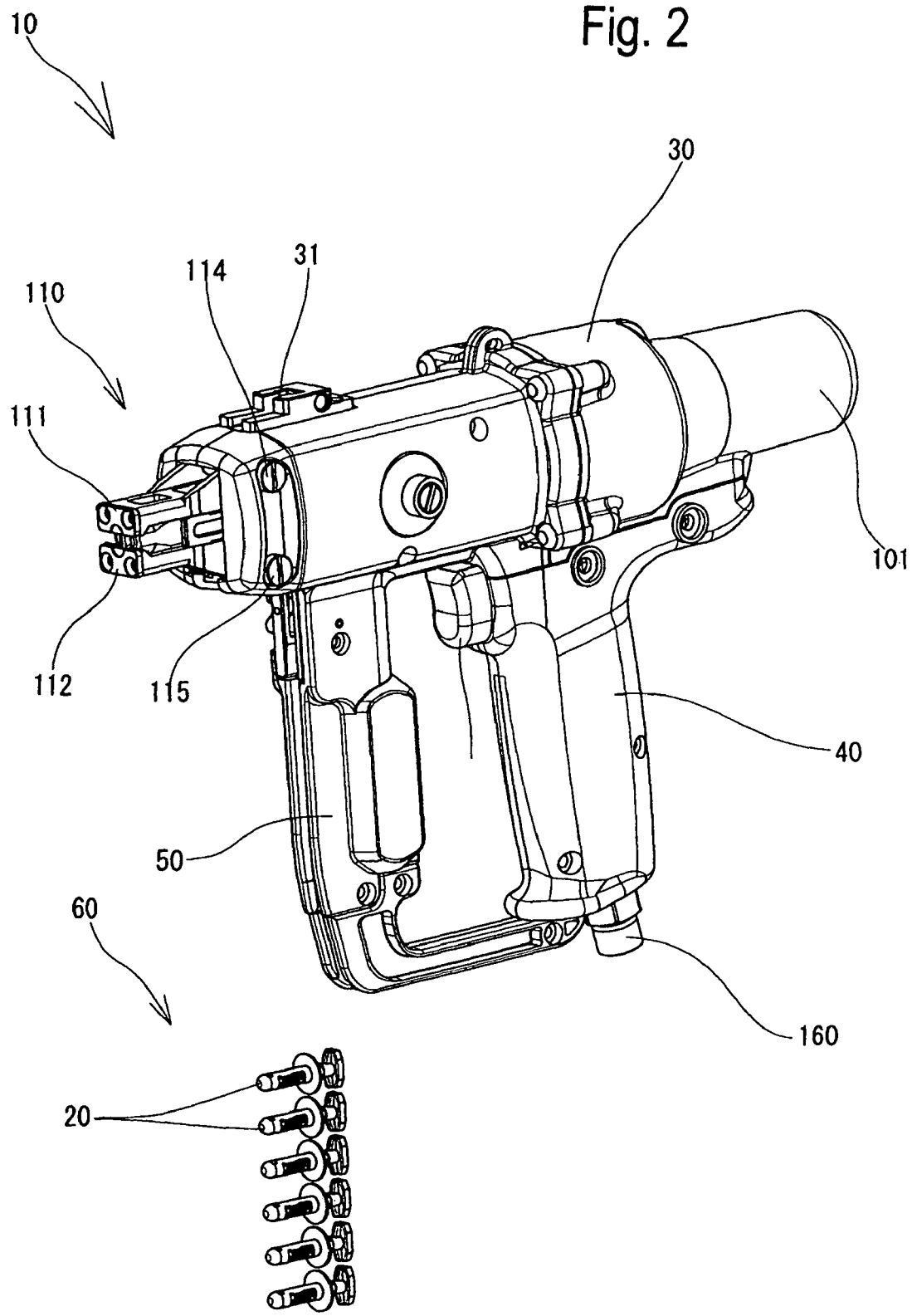
FIG. 2 is a perspective view of the air tool and a rivet row.
Figure 3:
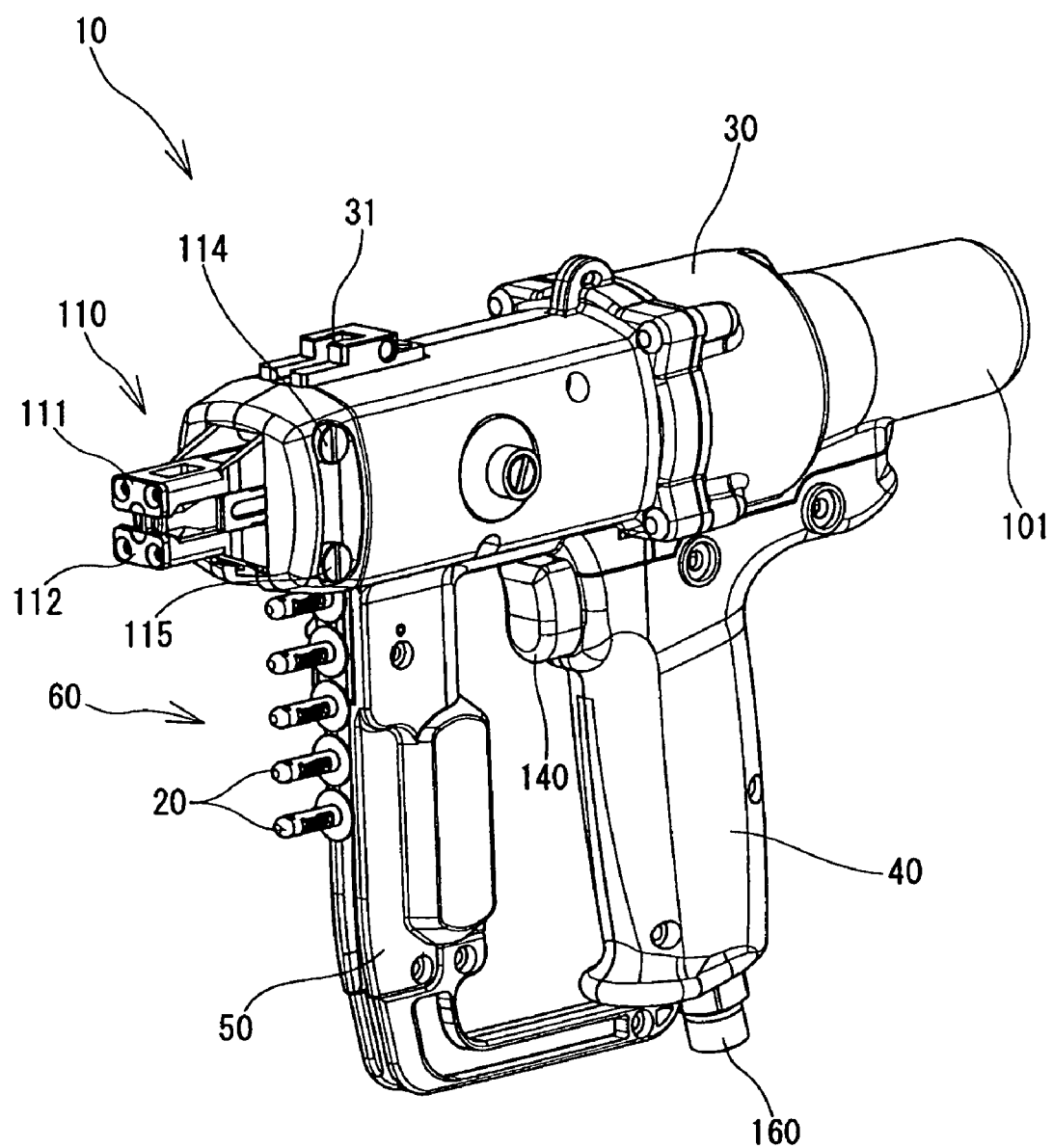
FIG. 3 is a perspective view of the air tool in a state wherein the rivet row is placed.
Figure 4:
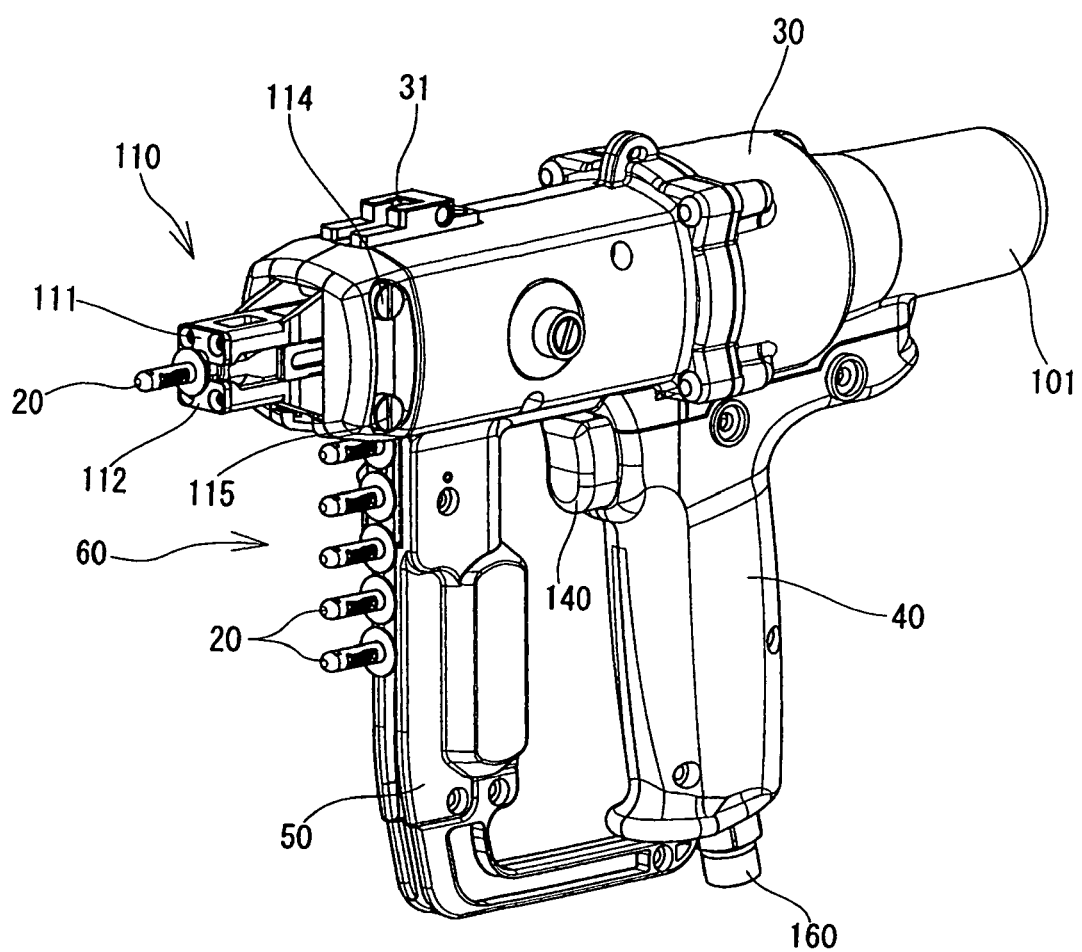
FIG. 4 is a perspective view of the air tool in a state wherein rivets are loaded in a cutter device.
Figure 5:
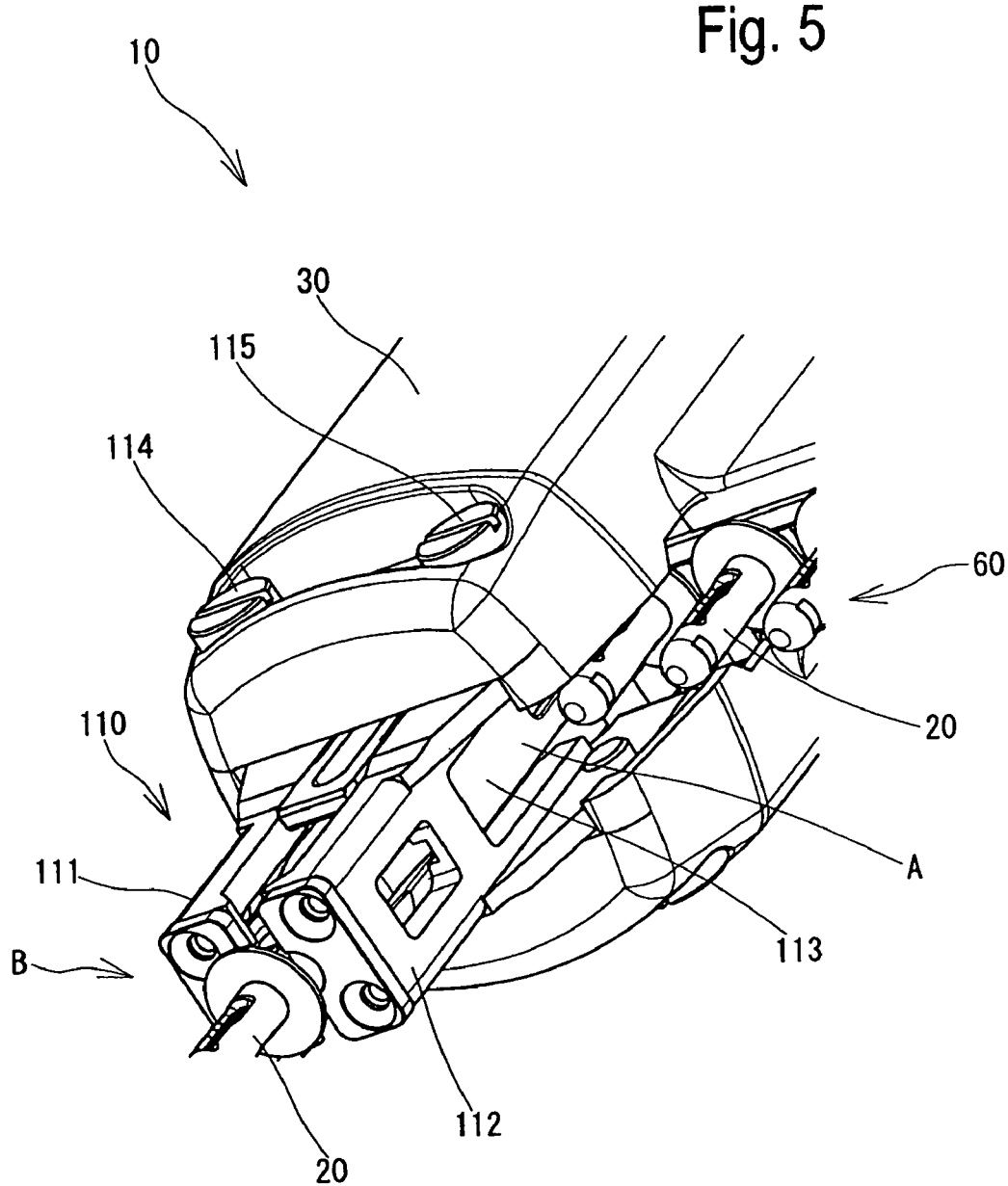
FIG. 5 is a perspective view wherein a part of the air tool is enlarged.
Figure 9:
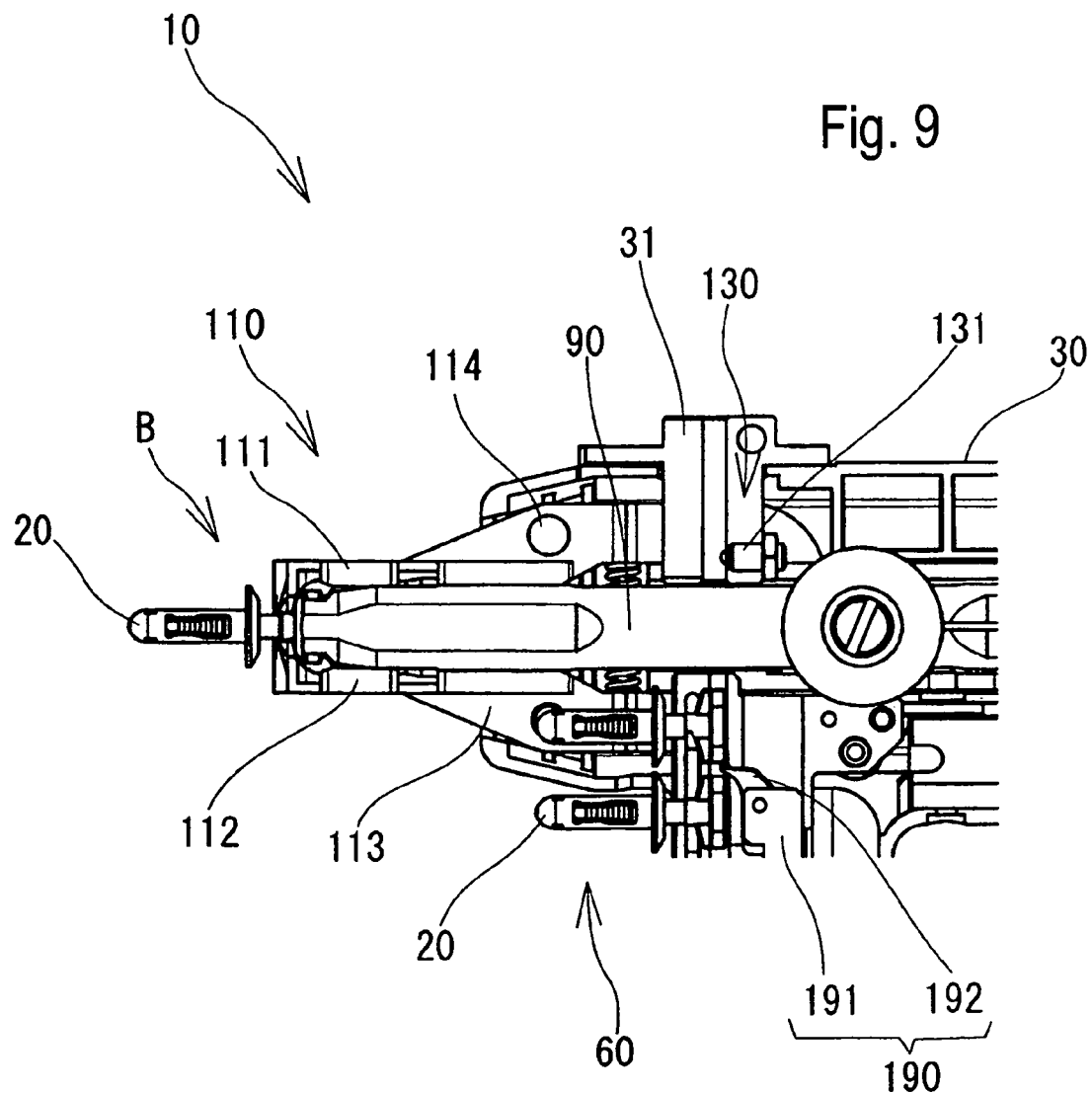
FIG. 9 is a partial vertical sectional view of the air tool.
Figure 10:
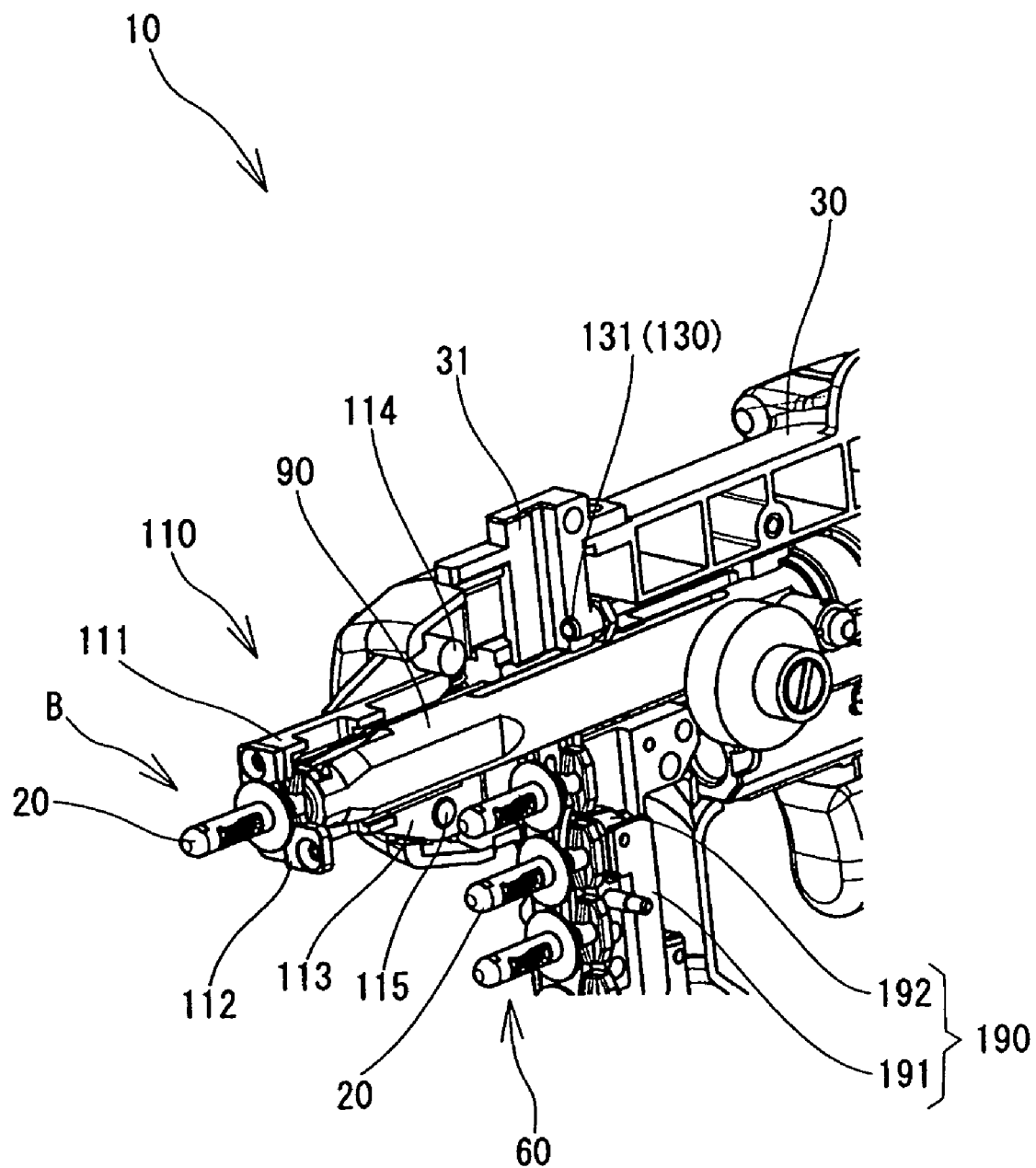
FIG. 10 is a partial perspective view wherein the air tool is vertically sectioned.

FIG. 1 is a pneumatic circuit diagram of an air tool; FIG. 2 is a perspective view of the air tool and a rivet row; FIG. 3 is a perspective view of the air tool in a state wherein the rivet row is placed; FIG. 4 is a perspective view of the air tool in a state wherein rivets are loaded in a cutter device; FIGS. 5 to 8 are perspective views wherein a part of the air tool is enlarged; FIG. 9 is a partial vertical sectional view of the air tool; FIG. 10 is a partial perspective view wherein the air tool is vertically sectioned; and FIGS. 11 to 20 are respective pneumatic circuit diagrams of each operating state with respect to FIG. 1.

Figure 21:
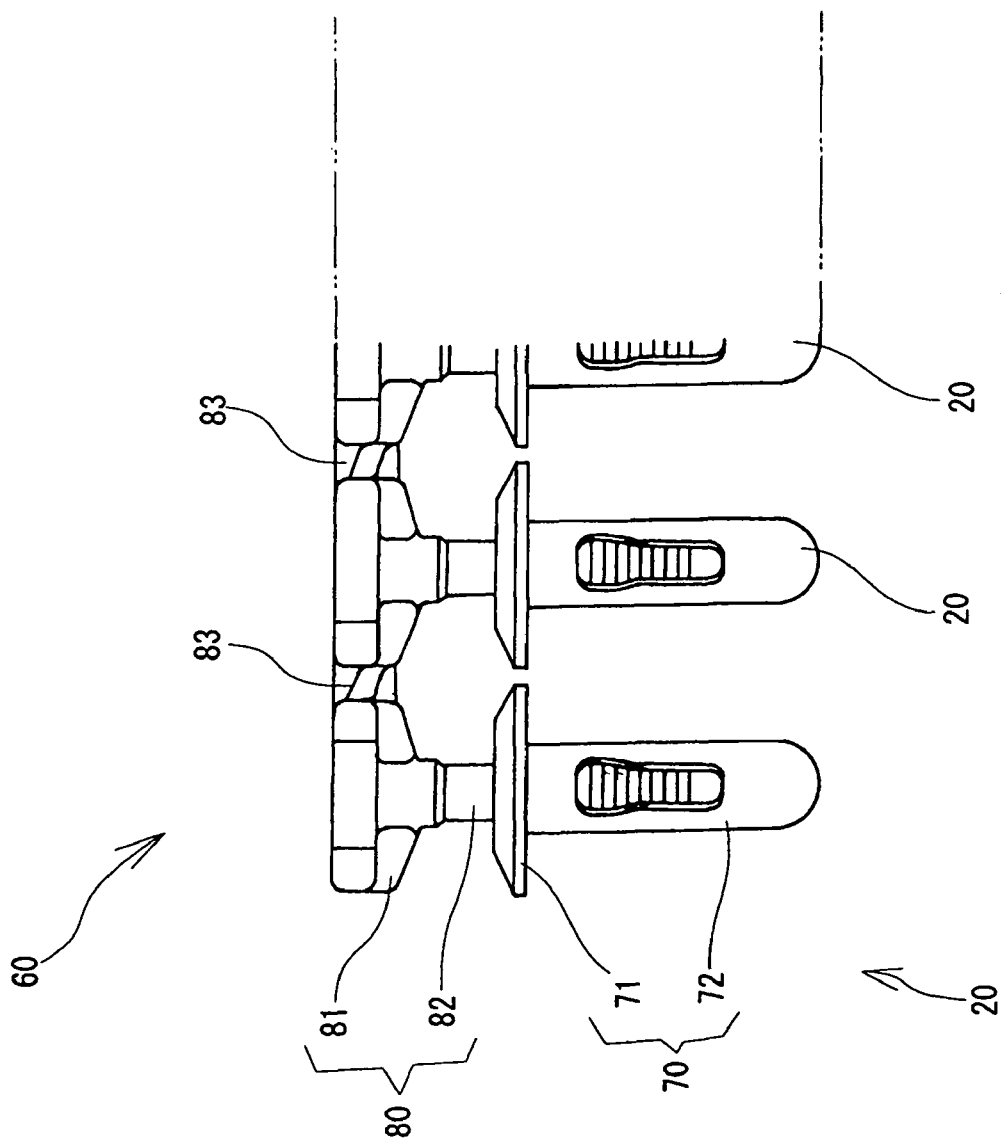
FIG. 21 is a partial front view of the rivet row.
Figure 22:
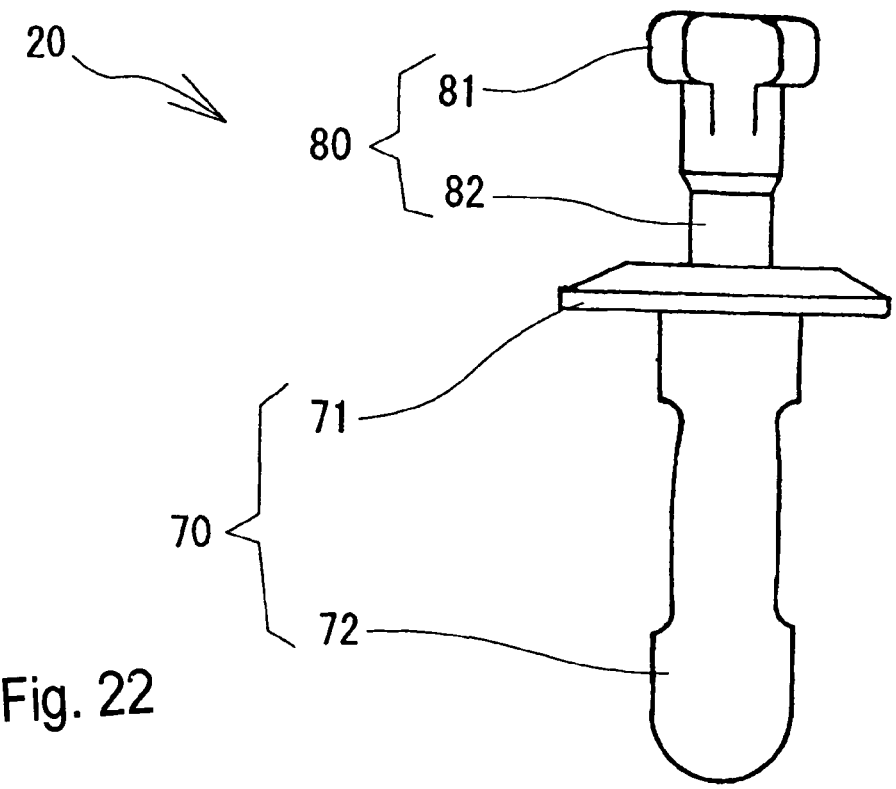
FIG. 22 is a side view of the rivet row.
Figure 23:
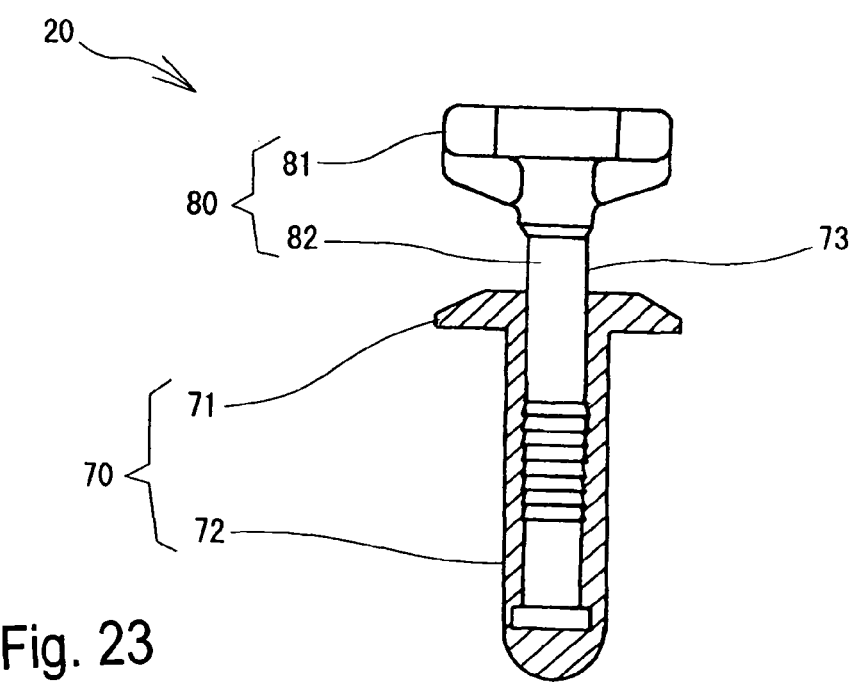
FIG. 23 is a vertical sectional view of the rivets.
Figure 24:
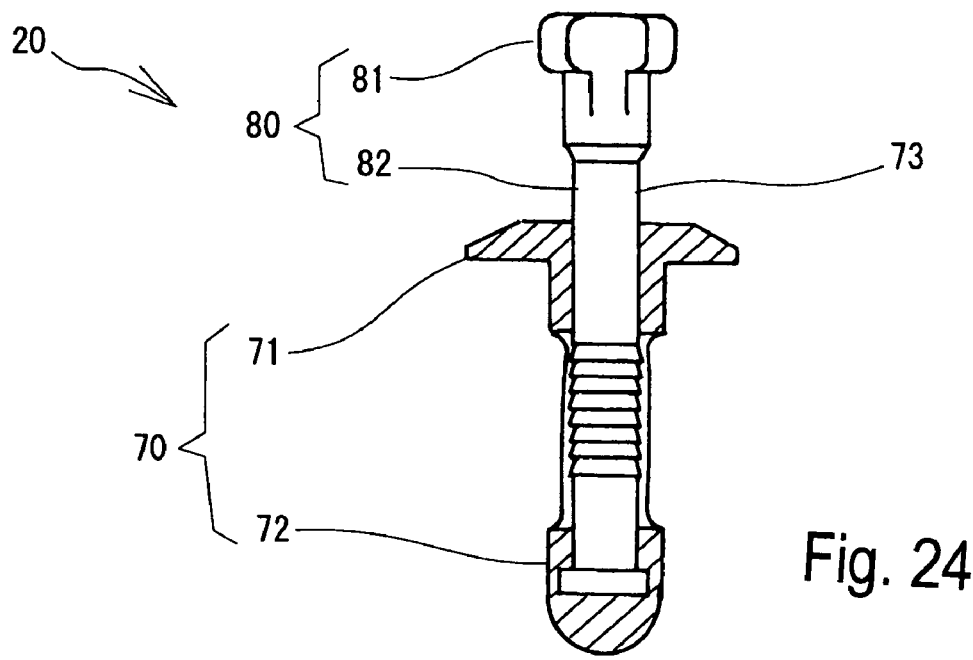
FIG. 24 is a vertical sectional view of other parts of the rivets.
Figure 25:
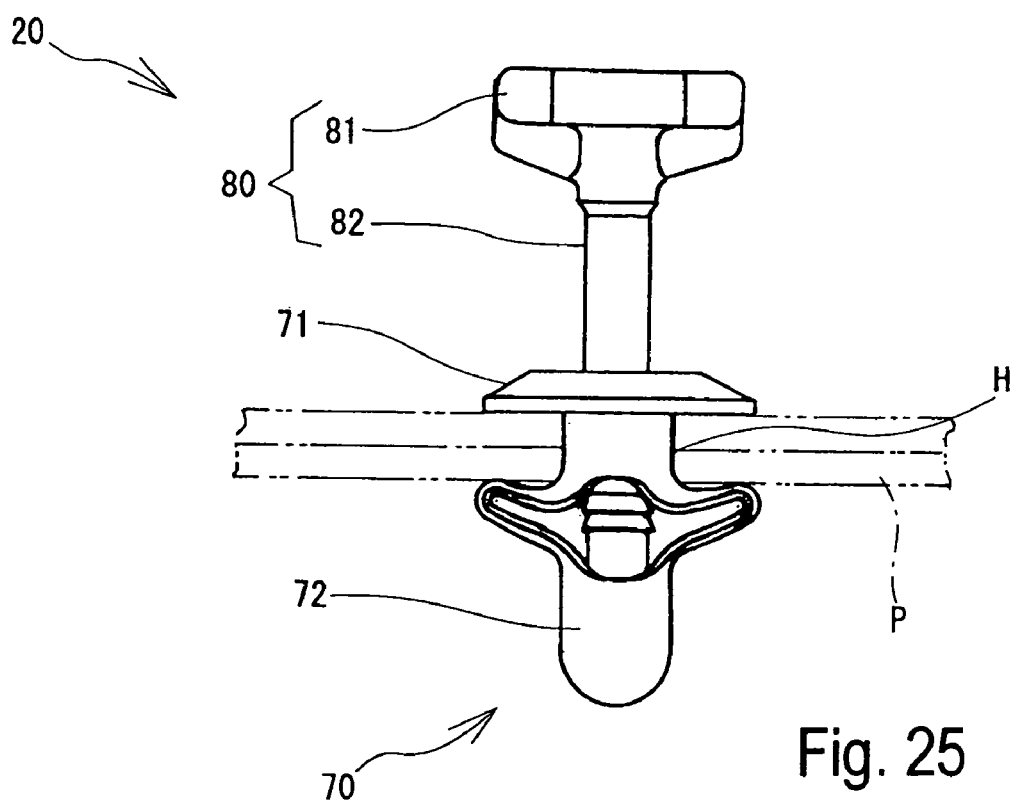
FIG. 25 is a front view for explaining a fastened state of the rivets.
Figure 26:
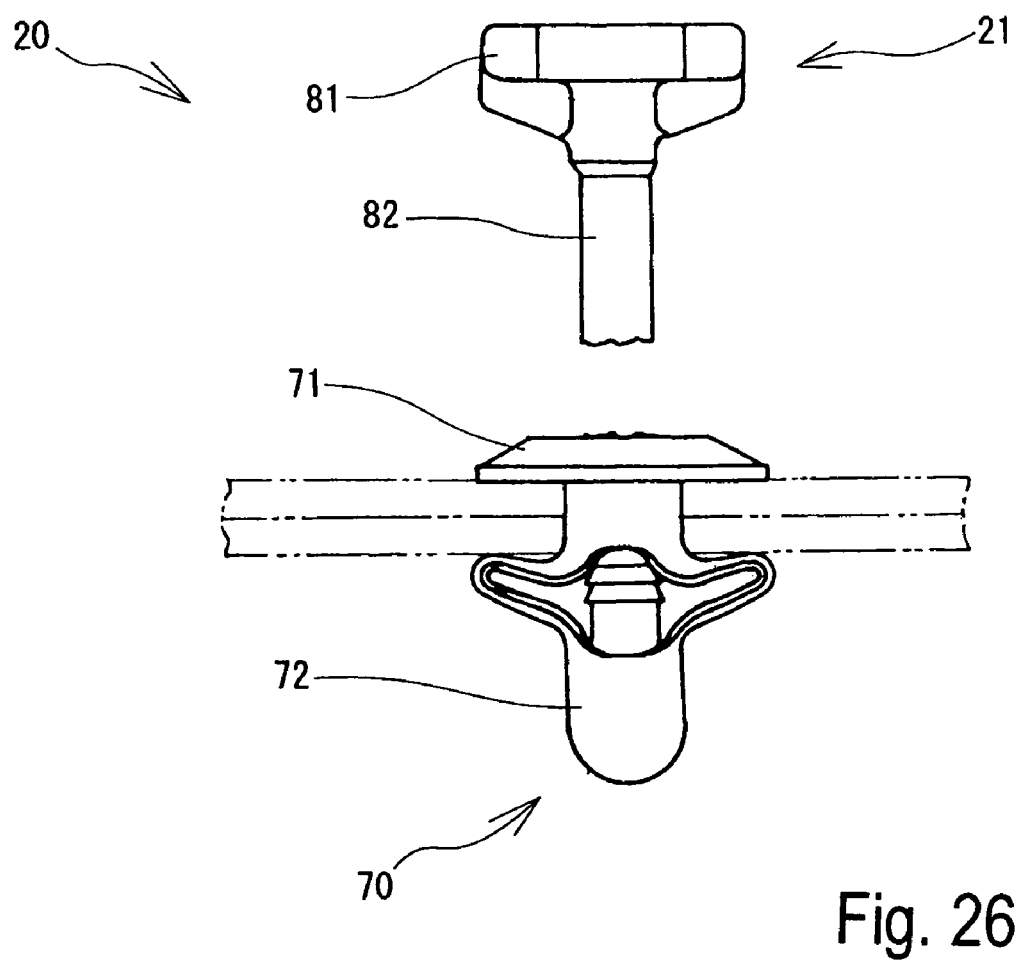
FIG. 26 is a front view for explaining a state wherein the rivets are cut off.

FIGS. 21 to 26 are drawings for explaining the rivets. FIG. 21 is a partial front view of the rivet row; FIG. 22 is a side view of the rivet row; FIG. 23 is a vertical sectional view of the rivets; FIG. 24 is a vertical sectional view of other parts of the rivets; FIG. 25 is a front view for explaining a fastened state of the rivets; and FIG. 26 is a front view for explaining a state wherein the rivets are cut off, respectively.

Figure 27:
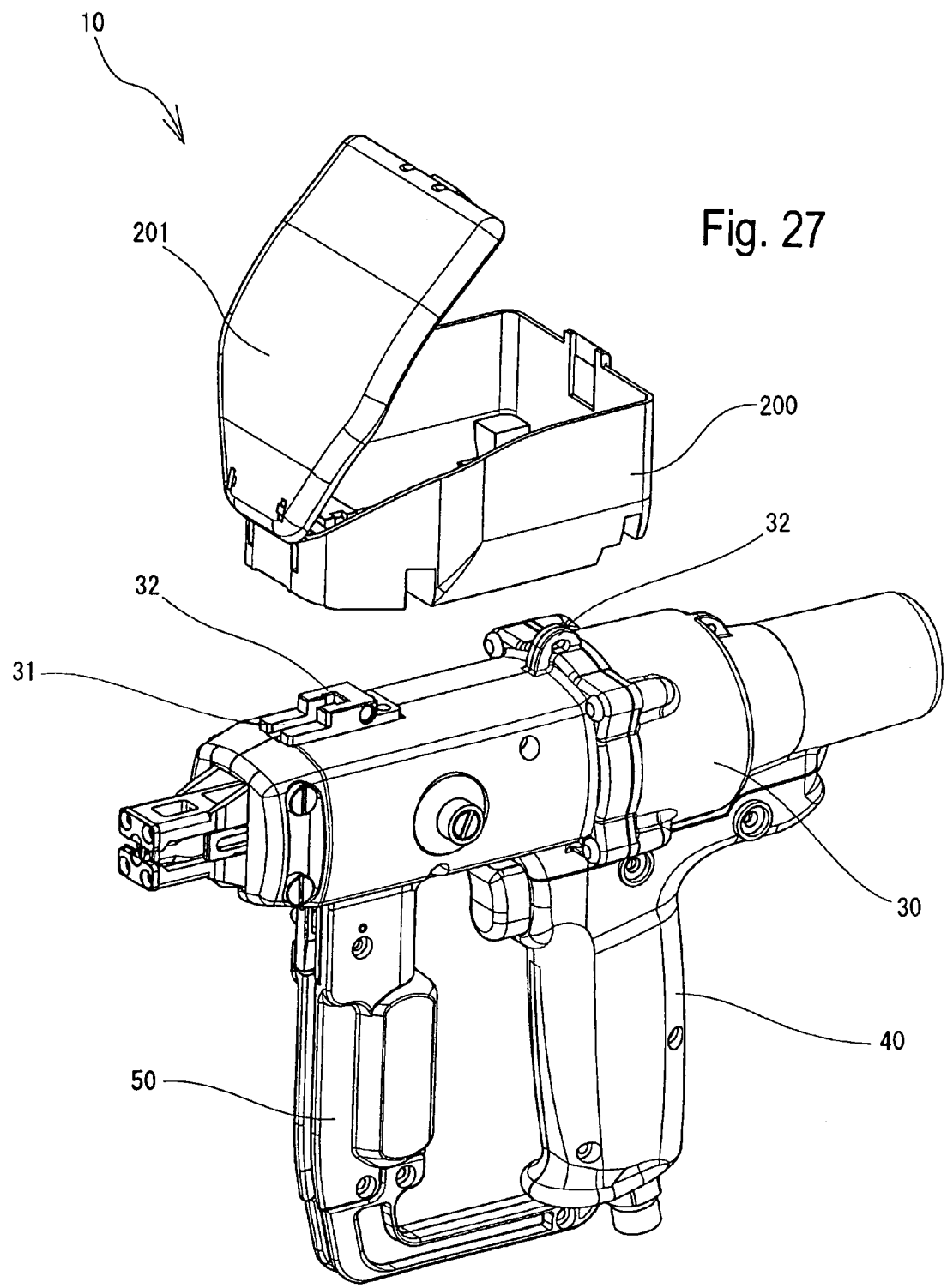
FIG. 27 is a perspective view of the air tool before a housing case is attached.
Figure 28:
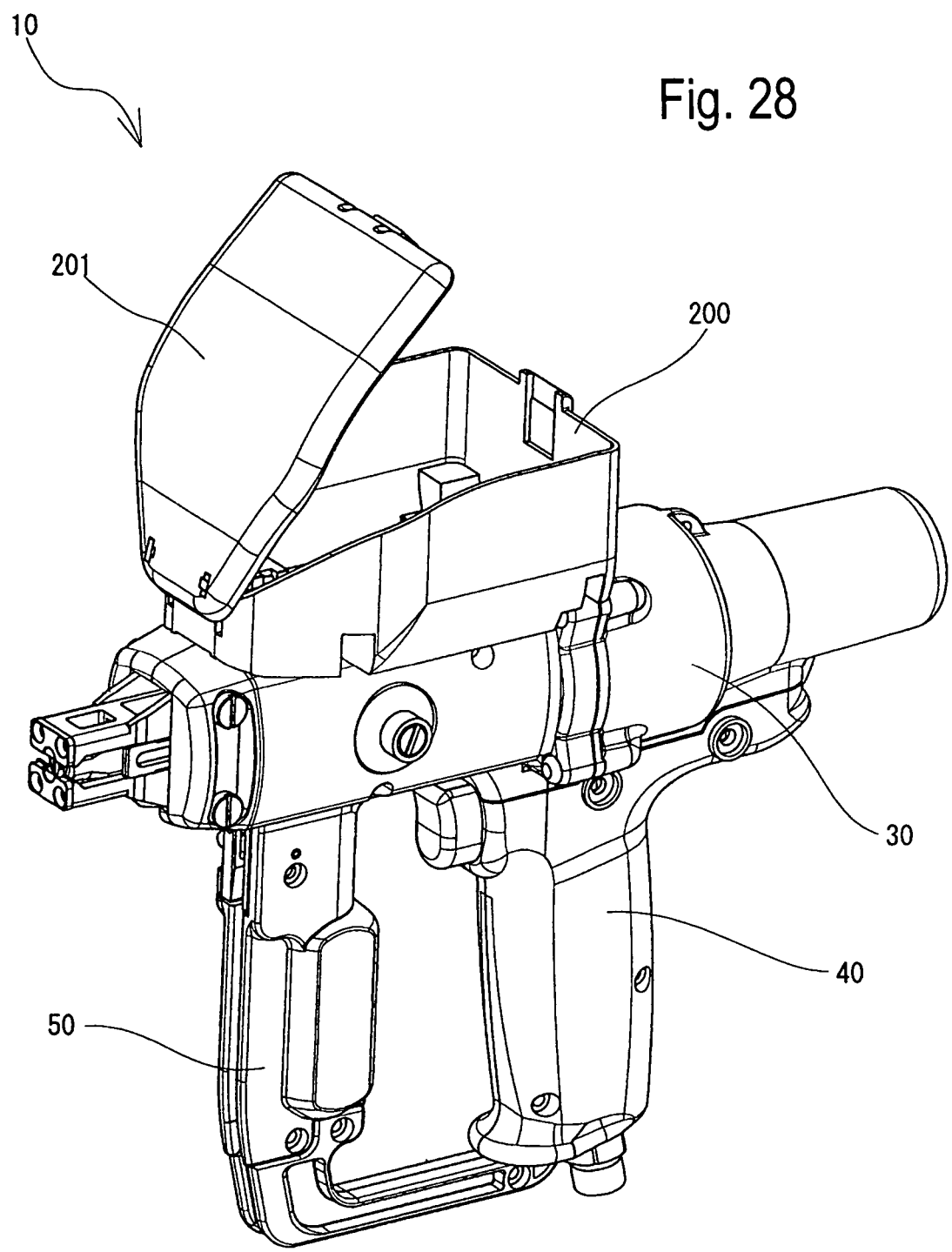
FIG. 28 is a perspective view of the air tool after the housing case is attached.

FIGS. 27, 28 are drawings for explaining attachment and removal of a housing case. FIG. 27 is a perspective view of the air tool before the housing case is attached; and FIG. 28 is a perspective view of the air tool after the housing case is attached, respectively.

(Rivet Fastening Air Tool 10)

In FIGS. 2 to 4, a reference numeral 10 shows a rivet fastening air tool, and this air tool 10 is used for continuously fastening blind-type rivets 20 using the air.

Broadly speaking, as shown in FIGS. 2 to 4, the air tool 10 has the following structure.

(1) Main body portion 30

A main body portion 30 is formed in a long cylindrical form backward and forward.

(2) Operating portion 40

An operating portion 40 extends downward from the back of the main body portion 30, and operates the air tool 10.

(3) Supplying portion 50

A supplying portion 50 is located in front of the operating portion 40, and continuously supplies the rivets 20 to a loaded position A of the main body portion 30 one by one.

(Explanation of Processes)

Broadly speaking, the following processes are performed by the air tool 10.

Incidentally, operating processes of the air tool 10 are not limited to the following (1) to (4).

(1) Loading process of rivets 20

In this process, the rivets 20, which are supplied one by one through the supplying portion 50, are received at the loaded position A, and the received rivets 20 are moved forward and retained in an implanted position B.

(2) Fastening process of rivets 20

Figure 6:
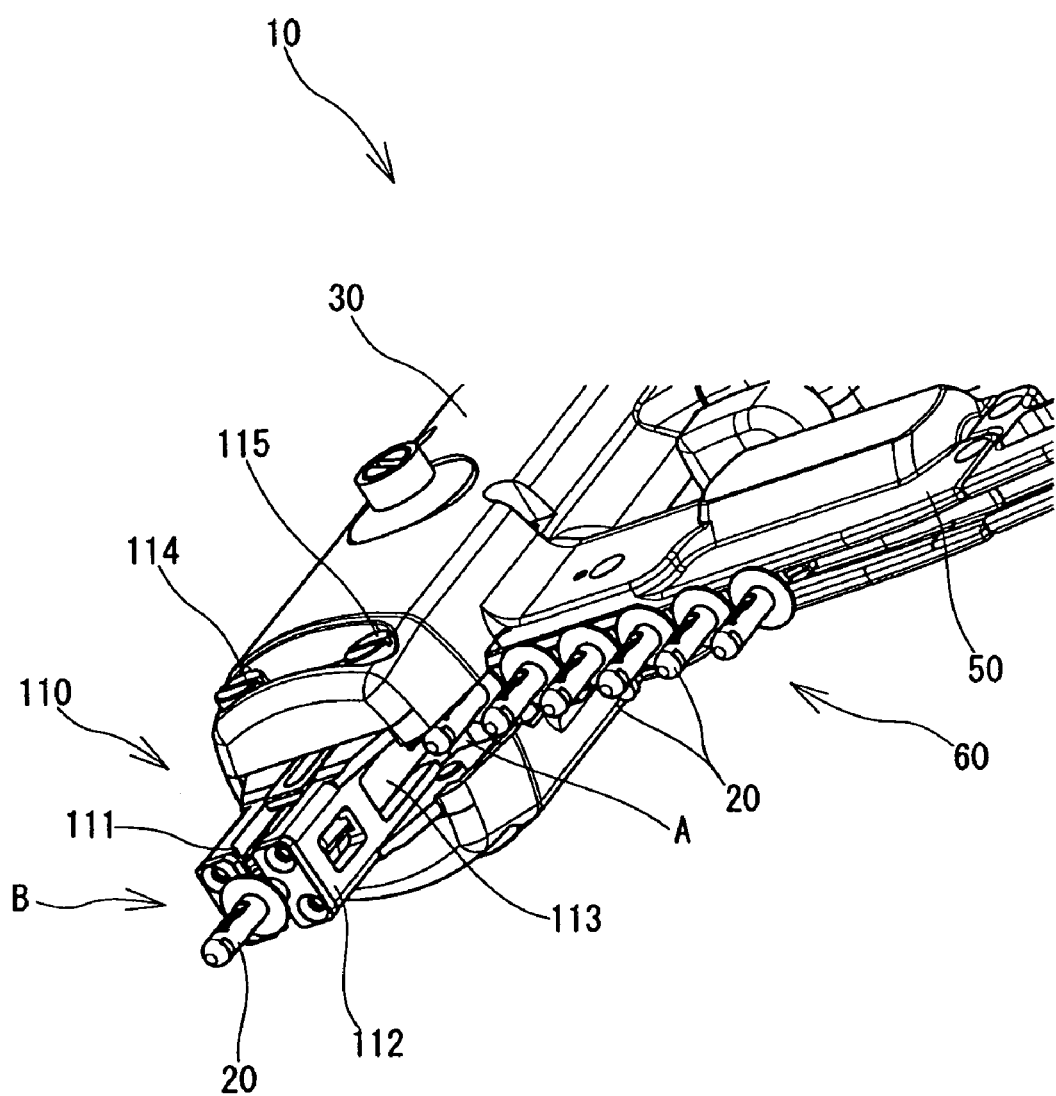
FIG. 6 is a perspective view wherein a part of the air tool is enlarged.
Figure 7:
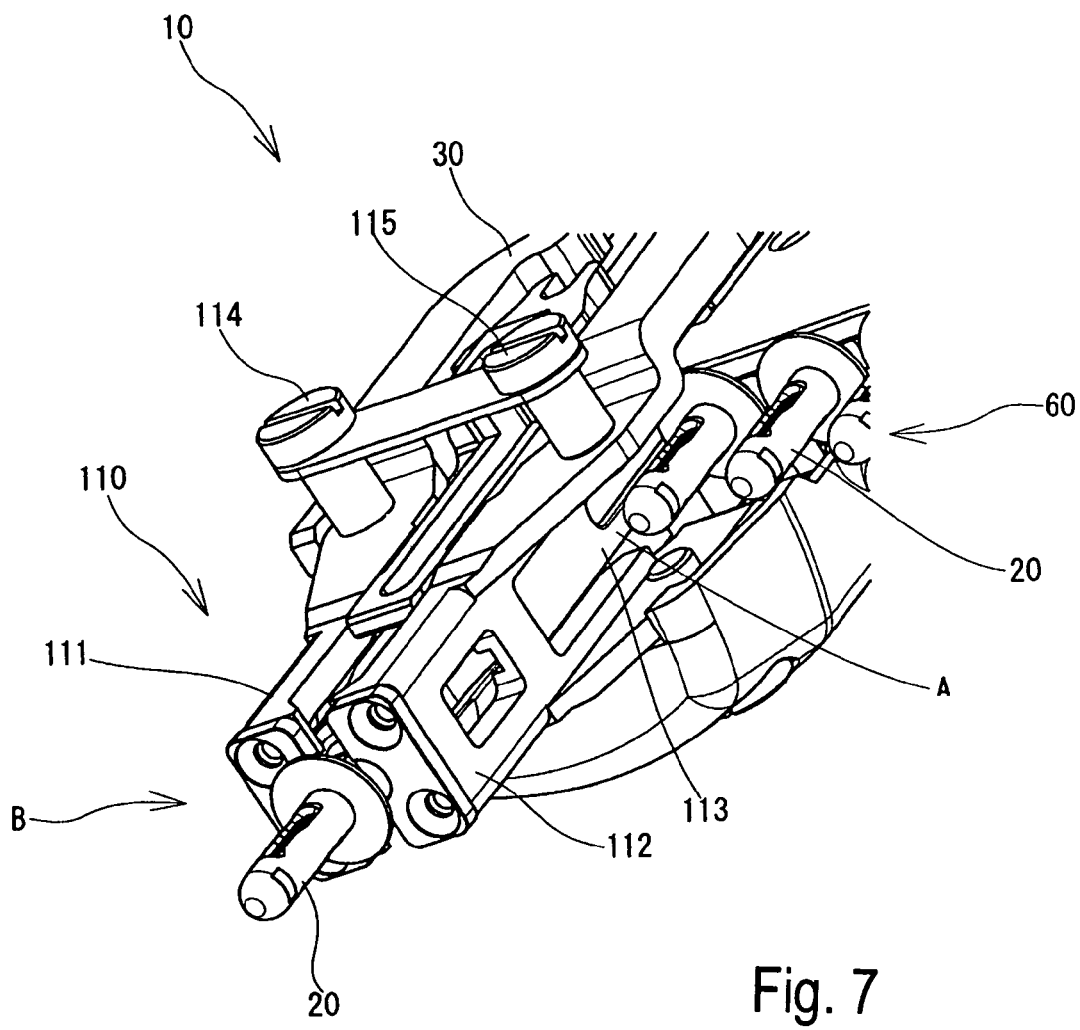
FIG. 7 is a perspective view wherein a part of the air tool is enlarged.
Figure 8:
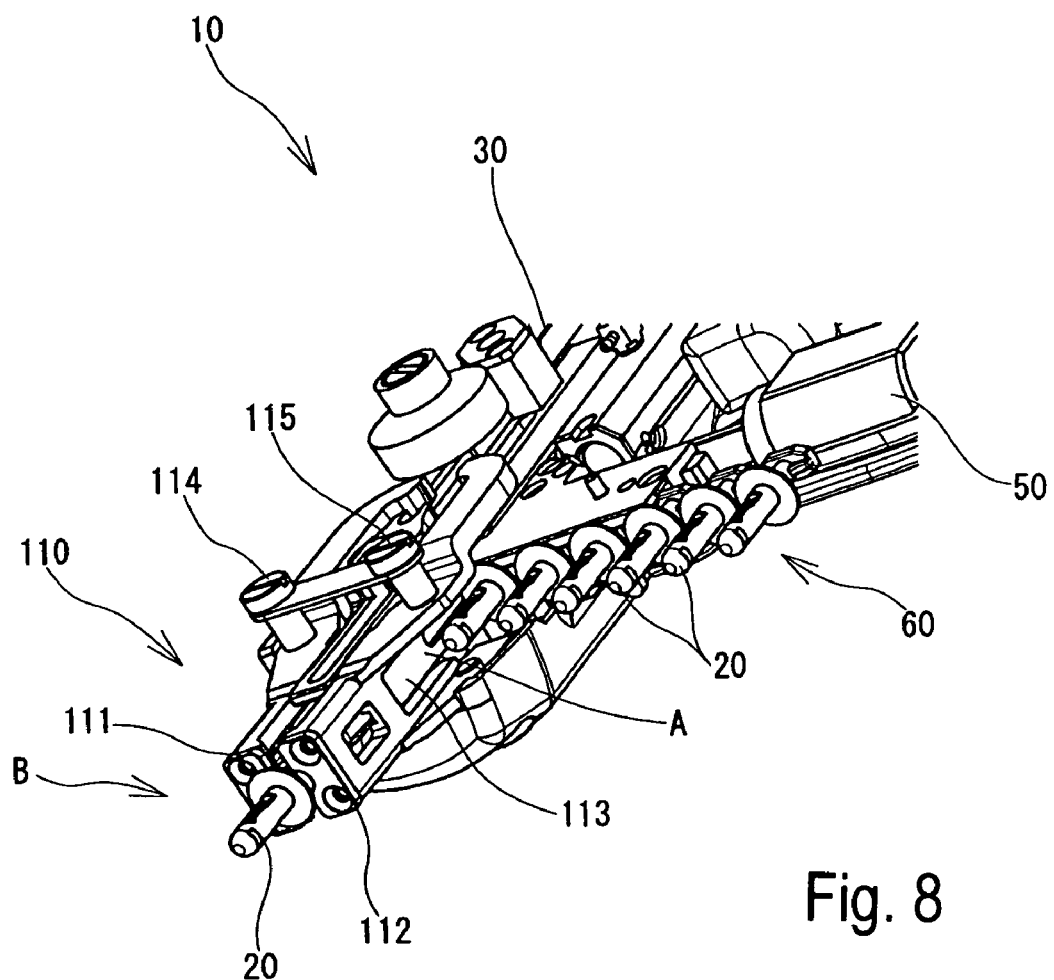
FIG. 8 is a perspective view wherein a part of the air tool is enlarged.

In this process, as shown in FIG. 6, the rivets 20 retained in the implanted position B are fitted and inserted in attachment bores H provided in panels P which are attachment sides; and fastened relative to the attachment bores H by the operation of the operating portion 40 as a trigger.

Incidentally, in the embodiment, the respective attachment bores are provided in two sheets of panels and the rivets 20 are implanted in a state wherein both panels are overlapped and the reciprocal attachment bores are interfaced. By fastening the rivets 20, both panels are fixed in an overlapped state. Obviously, although the panels P are shown as an example of the attachment sides, they are not limited to the panels P.

(3) Cutting-off process of rivets 20

In this process, as shown in FIG. 26, remaining portions 21 of the fastened rivets 20 are cut off.

(4) Discharging process of rivets 20

In this process, the remaining portions 21, which were cut off from the rivets 20, are moved backward to the loaded position A from the implanted position B, and discharged through a discharge passage 31 communicated with the loaded position A.

Incidentally, in the air tool 10 of the embodiment, the discharging process of the rivets 20 and the loading process of the rivets 20 are continuously carried out as one process.

(Rivets 20)

As shown in FIGS. 2, 21, in the rivets 20, a series of plural rivets, for example, six rivets are connected and lined up, and form a rivet row 60.

Incidentally, although the number of the rivets 20 forming the rivet row 60 is shown as six, the number may be 2 to 5, or 7 or above.

The rivet row 60 is integrally molded by resin with appropriate elasticity and rigidity.

Broadly speaking, as shown in FIGS. 21 to 24, each rivet 20 is formed of the following parts.

Incidentally, the following (1), (2) will be described hereinafter.

(1) Female member 70

(2) Male member 80

Incidentally, the parts of each rivet 20 are not limited to the above-mentioned (1), (2).

(Female Member 70)

As shown in FIGS. 21 to 24, a female member 70 includes the following portions.

Incidentally, each portion of the female member 70 is not limited to the following (1) to (3).

(1) Base portion 71

As shown in FIG. 25, a base portion 71 has a disk shape and the outside diameter thereof is configured larger than the inside shape of the attachment bores H provided in the panels P which are the attachment sides.

(2) Leg portion 72

As shown in FIG. 25, a leg portion 72 extends from the base portion 71, is inserted in the attachment bores H of the panels P, and bent on the rear face side of the attachment bores H, so that the diameter of the leg portion 72 can be expanded.

Incidentally, as shown in FIG. 21, the leg portion 72 includes a total of two window portions which are reversed to each other. As shown in FIG. 25, the leg portion 72 is bent in an approximately "<" or V shape with a hinge of a part without the window portions.

(3) Communicating bore 73

As shown in FIGS. 23, 24, a communicating bore 73 is communicated between the base portion 71 and the leg portion 72.

(Male Member 80)

As shown in FIGS. 21 to 24, a male member 80 includes the following portions.

(1) Head portion 81

As shown in FIGS. 23, 24, a head portion 81 has a disk shape and the outside diameter thereof is configured larger than the inside shape of the communicating bore 73.

(2) Shaft portion 82

As shown in FIGS. 23 to 25, a shaft portion 82 extends from the head portion 81 and is inserted into the communicating bore 73 to be able to be pulled out. The shaft portion 82 opens the leg portion 72 by moving the shaft portion 82 in a direction of being pulled out of the communicating bore 73.

Incidentally, as shown in FIGS. 21, 23, 24, multiple-tier circular depressions and projections are provided halfway down the length of the shaft portion 82. As shown in FIG. 25, the depressions and projections are provided so that the leg portion 72 which is bent in the approximately "<" or V shape can not return.

(3) Fragile portion 83

As shown in FIG. 21, a fragile portion 83 connects the adjacent head portions 81 as a sequence in such a way that the leg portion 72 of the female member 70 faces the same direction.

(Main Body Portion 30)

As shown in FIGS. 1 to 4, 9, 10, the main body portion 30 includes the following parts.

Incidentally, the following (1) to (5) will be described hereinafter.

(1) Main shaft 90
(2) Implanting actuator 100
(3) Cutter device 110
(4) Switching valve 120
(5) Reversal control means 130

Incidentally, the parts of the main body portion 30 are not limited to the above-mentioned (1) to (5).

(Operating Portion 40)

As shown in FIGS. 1 to 4, the operating portion 40 includes the following parts.

Incidentally, the following (1) to (4) will be described hereinafter.

(1) Operating lever 140
(2) Trigger valve 150
(3) Hose connecting portion 160
(4) Divergent joint 170

Incidentally, parts of the operating portion 40 are not limited to the above-mentioned (1) to (4).

(Supplying Portion 50)

As shown in FIGS. 1 to 4, 9, 10, the supplying portion 50 includes the following parts.

Incidentally, the following (1) to (2) will be described hereinafter.

(1) Supplying actuator 180
(2) Supplying mechanism 190

Incidentally, parts of the supplying portion 50 are not limited to the above-mentioned (1) to (2).

(Main Shaft 90)

As shown in FIG. 1, a main shaft 90 is supported to be slidable back and forth inside the main body portion 30. The front end portion of the main shaft 90 retains the head portions 81 of the rivets 20, and the back end portion of the main shaft 90 is connected to the inner piston 103 described hereinafter of an implanting actuator 100.

As shown in FIG. 1, the main shaft 90 includes the following structure.

Incidentally, the structure of the main shaft 90 is not limited to the following (1).

(1) Switching groove 91

A switching groove 91 conducts a switching operation of the switching valve 120 described hereinafter.

Figure 14:
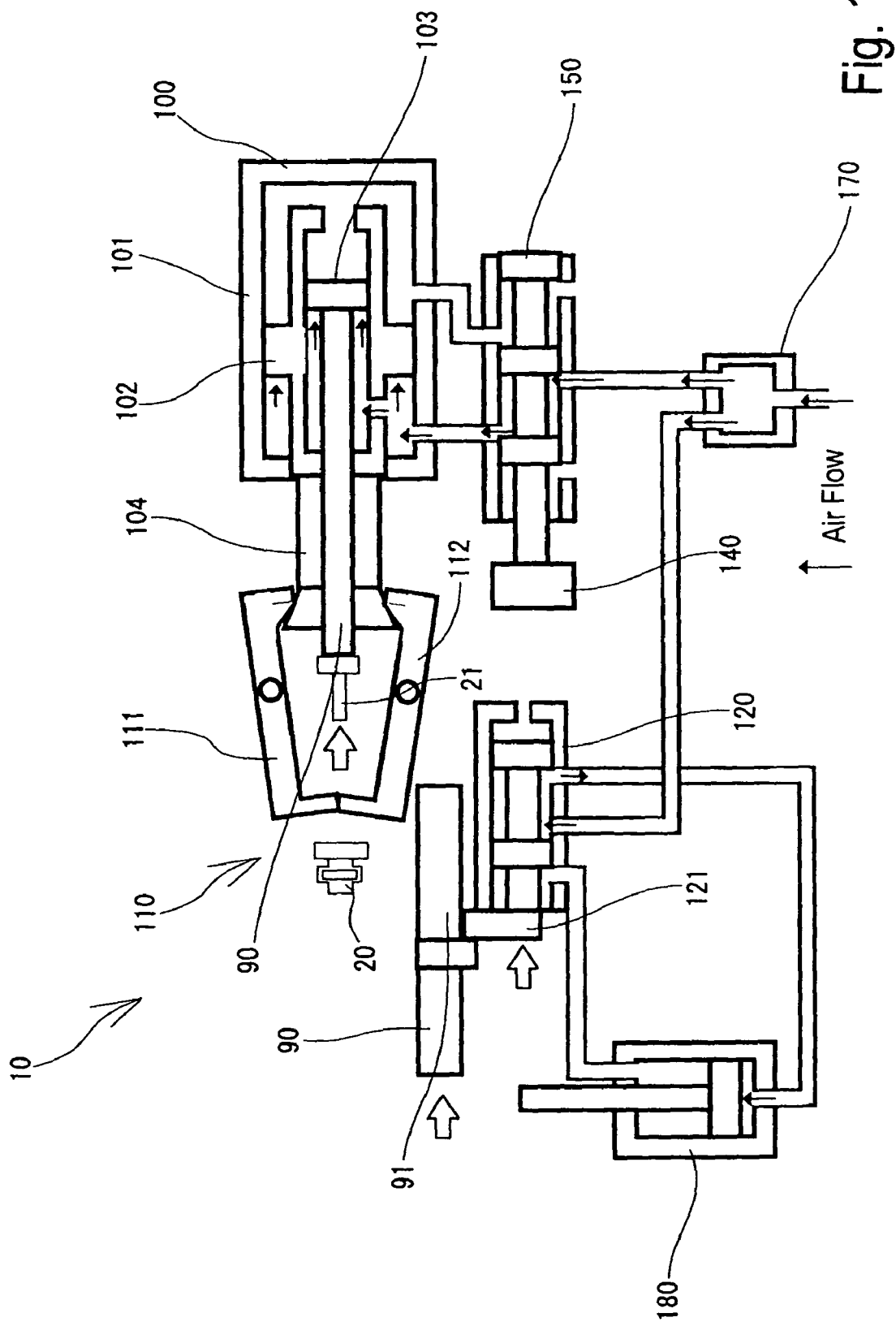
FIG. 14 is a pneumatic circuit diagram of each operating state with respect to FIG. 1.

Specifically, as shown in FIG. 1, a switching shaft 121 of the switching valve 120 is fitted into the switching groove 91, and as shown in FIG. 14, when the main shaft 90 moves backward, the switching shaft 121 is pushed by the end face of the switching groove 91, so that the switching valve 120 is switched.

(Implanting Actuator 100)

The implanting actuator 100 retains the head portions 81 of the rivets 20 supplied in the implanted position B through the main shaft 90 and moves them in the direction of being pulled out of the communicating bores 73.

Also, the implanting actuator 100 functions as a drive source of the cutter device 110 described hereinafter.

Specifically, as shown in FIG. 1, the implanting actuator 100 includes the following parts.

Incidentally, the following (1) to (4) will be described hereinafter.

(1) Main cylinder 101
(2) Outer piston 102
(3) Inner piston 103
(4) Slide cam 104

Incidentally, parts of the implanting actuator 100 are not limited to the above-mentioned (1) to (4).

(Main Cylinder 101)

As shown in FIGS. 1 to 4, a main cylinder 101 is positioned in the length direction of the main body portion 30, and a part on the head side of the main cylinder 101 is exposed from the main body portion 30.

As shown in FIG. 1, the main cylinder 101 includes two input ports. Among the two input ports, one input port is positioned on the head side of the main cylinder 101, and the other input port is positioned on the rod side of the main cylinder 101.

The input port on the head side is connected to an output port on the head side of a trigger valve 150. The input port on the rod side is connected to an output port on the rod side of the trigger valve 150.

As shown in FIG. 1, in the main cylinder 101, in the initial state, the air pressure flows from the output port on the head side of the trigger valve 150 to the input port on the head side, the outer piston 102 described hereinafter slides to the rod side and moves forward.

Figure 11:
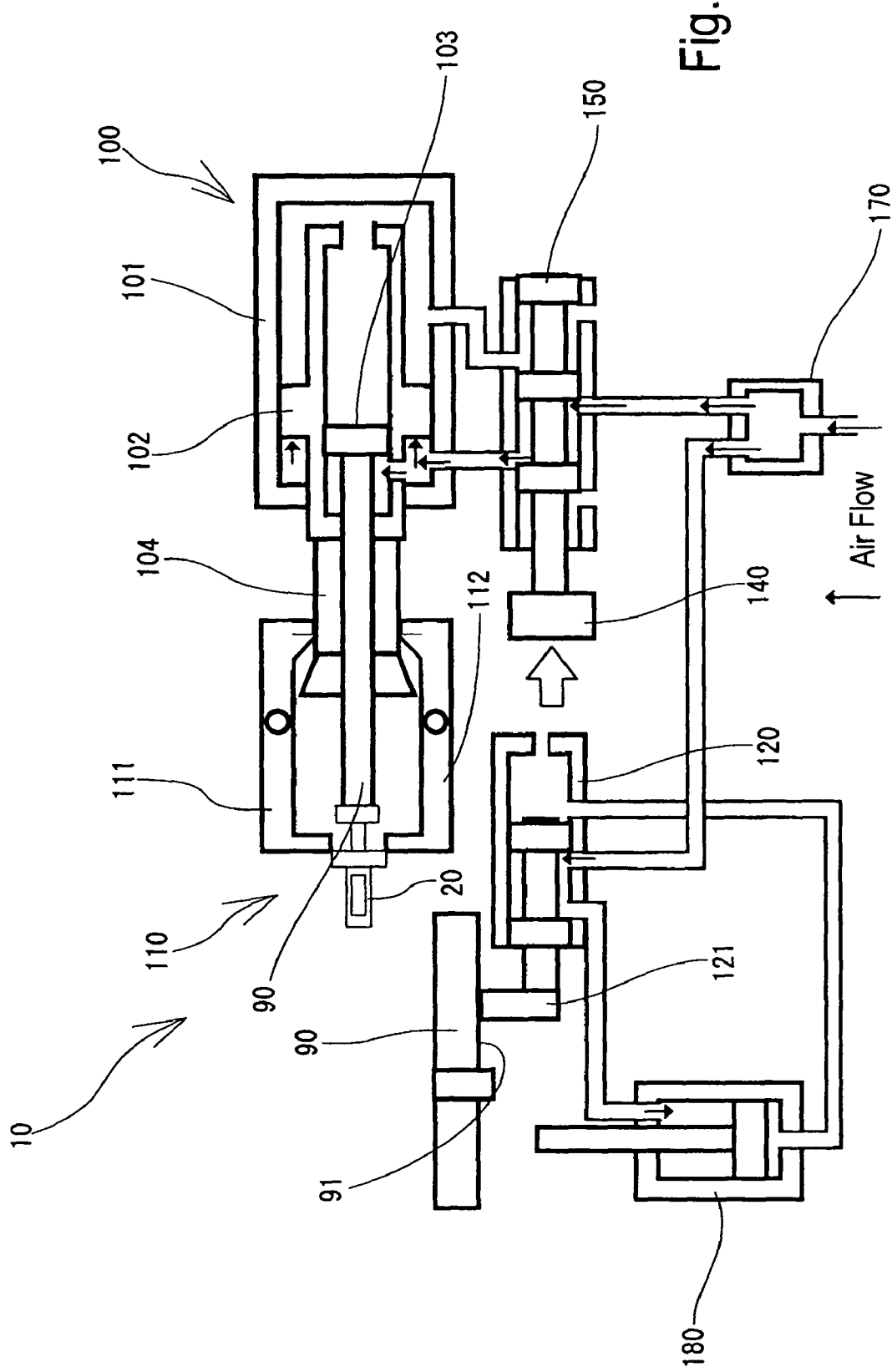
FIG. 11 is a pneumatic circuit diagram of each operating state with respect to FIG. 1.

As shown in FIG. 11, when an operating lever 140 of the trigger valve 150 described hereinafter is operated, the air pressure flows from the output port on the rod side of the trigger valve 150 to the input port on the rod side of the trigger valve 150, and the outer piston 102 slides to the head side and moves backward.

(Outer Piston 102)

As shown in FIG. 1, the outer piston 102 is housed in the main cylinder 101 to be slidable and formed in a cylinder type.

The outer piston 102 includes two input ports. Among the two input ports, one input port is located on the head side of the cylinder-type outer piston 102, and the other input port is located on the rod side of the cylinder-type outer piston 102.

As shown in FIG. 1, in the outer piston 102, in the initial state, the air pressure flows from the input port on the head side of the main cylinder 101 to the input port on the head side of the outer piston 102. The inner piston 103 described hereinafter slides toward the rod side and moves forward.

As shown in FIG. 11, when the operating lever 140 of the trigger valve 150 is operated, the air pressure flows from the input port on the rod side of the main cylinder 101 to the input port on the rod side of the outer piston 102. The inner piston 103 slides toward the head side and moves backward.

(Inner Piston 103)

As shown in FIG. 1, the inner piston 103 is housed in the outer piston 102 to be slidable.

The back end portion of the main shaft 90 is connected to the inner piston 103.

As shown in FIG. 1, in the initial state, the inner piston 103 slides toward the rod side of the outer piston 102 and moves forward.

As shown in FIG. 11, when the operating lever 140 of the trigger valve 150 is operated, the air inflows through the input port on the rod side of the outer piston 102, so that the inner piston 103 slides toward the head side of the outer piston 102 and moves backward.

(Slide Cam 104)

Figure 13:
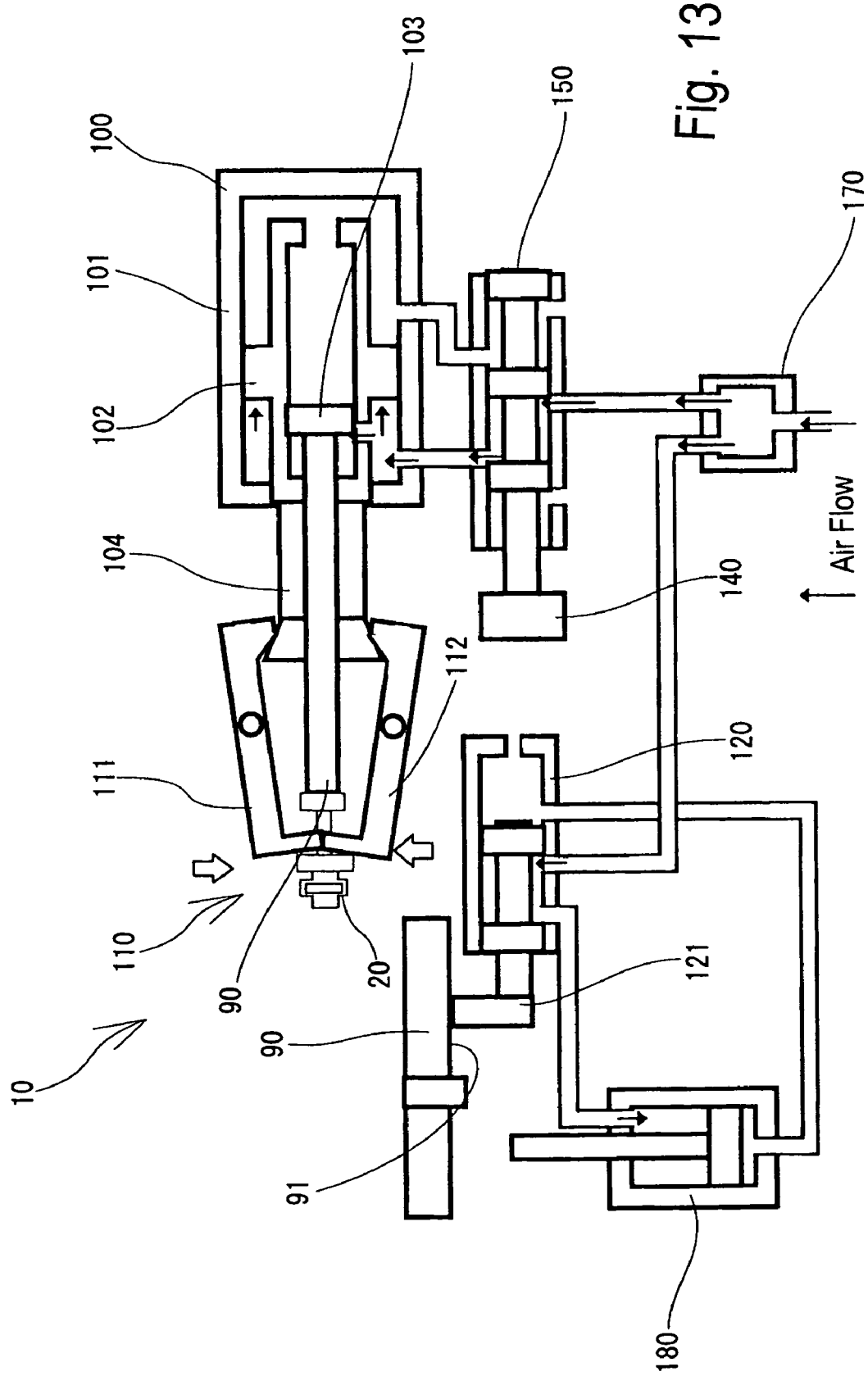
FIG. 13 is a pneumatic circuit diagram of each operating state with respect to FIG. 1.

As shown in FIG. 1, a slide cam 104 is connected to the outer piston 102, and usually retains the cutter device 110 in an open position, and due to the sliding of the outer piston 102, as shown in FIG. 13, the cutter device 110 moves to a closed position.

As shown in FIG. 1, in the front end portion of the slide cam 104, a cam portion is provided and open in an approximately "ﾉ丶" or V shape toward the front end portion.

The cam portion engages the cutter device 110, and as shown in FIG. 13, when the slide cam 104 moves backward, the cutter device 110 is switched from the open position to the closed position.

(Cutter Device 110)

As shown in FIG. 1, the cutter device 110 is located in the front end portion of the implanting actuator 100. In the open position, pieces of the cutter device 110 are distantly opposed to each other, and sandwich the shaft portion 82 of the rivet 20 within the opposed interval. As shown in FIGS. 13, 14, in the closed position, the cutter device 110 cuts the shaft portion 82 off, and separates the shaft portion 82 from the head portion 81.

Incidentally, the combined portion of a part of the shaft portion 82 which was cut off by the cutter device 110, and the head portion 81, is called the remaining portion 21 of the rivet 2 after being cut off, or simply the remaining portion 21 (refer to FIG. 26).

Specifically, as shown in FIGS. 1 to 10, the cutter device 110 comprises a pair of an upper cutter piece 111 and a lower cutter piece 112 which are axially fastened to be openable and closable.

Incidentally, according to the standard of the supplying direction of the rivet 20, the upper cutter piece 111 is located in front of the supplying portion, and the lower cutter piece 112 is located at the back of the supplying portion.

As shown in FIG. 1, the upper and lower cutter pieces 111, 112 are supported to be rotatable upward and downward in the middle of the length. The end portions on the front side of the upper and lower cutter pieces 111, 112 become a cutter, and the end portions on the back side of the upper and lower cutter pieces 111, 112 have engagement faces when engaged with the cam portion of the slide cam 104. The upper and lower engagement faces slant parallel to the cam portion of the slide cam 104, and specifically, close toward the back in an approximately "ﾉ丶" or V shape.

As shown in FIGS. 2 to 10, the upper and lower cutter pieces 111, 112 include the following portions.

(1) Opening 113

An opening 113 is provided in the lower cutter piece 112, and the very front-row rivet 20, which is transferred by the supplying actuator 180 described hereinafter, can pass through the opening 113.

(2) Upper bearings 114

Upper bearings 114 support the shaft of the upper cutter piece 111 so that the shaft of the upper cutter piece 111 can rotate upward and downward.

(3) Lower bearings 115

Lower bearings 115 support the shaft of the lower cutter piece 112 so that the shaft of the lower cutter piece 112 can rotate upward and downward. A pair of lower bearings 115 is provided on both sides of the opening 113 separately.

(Switching Valve 120)

The switching valve 120 is provided in the approximate middle of the total length of the implanting actuator 100 (not shown).

Figure 15:
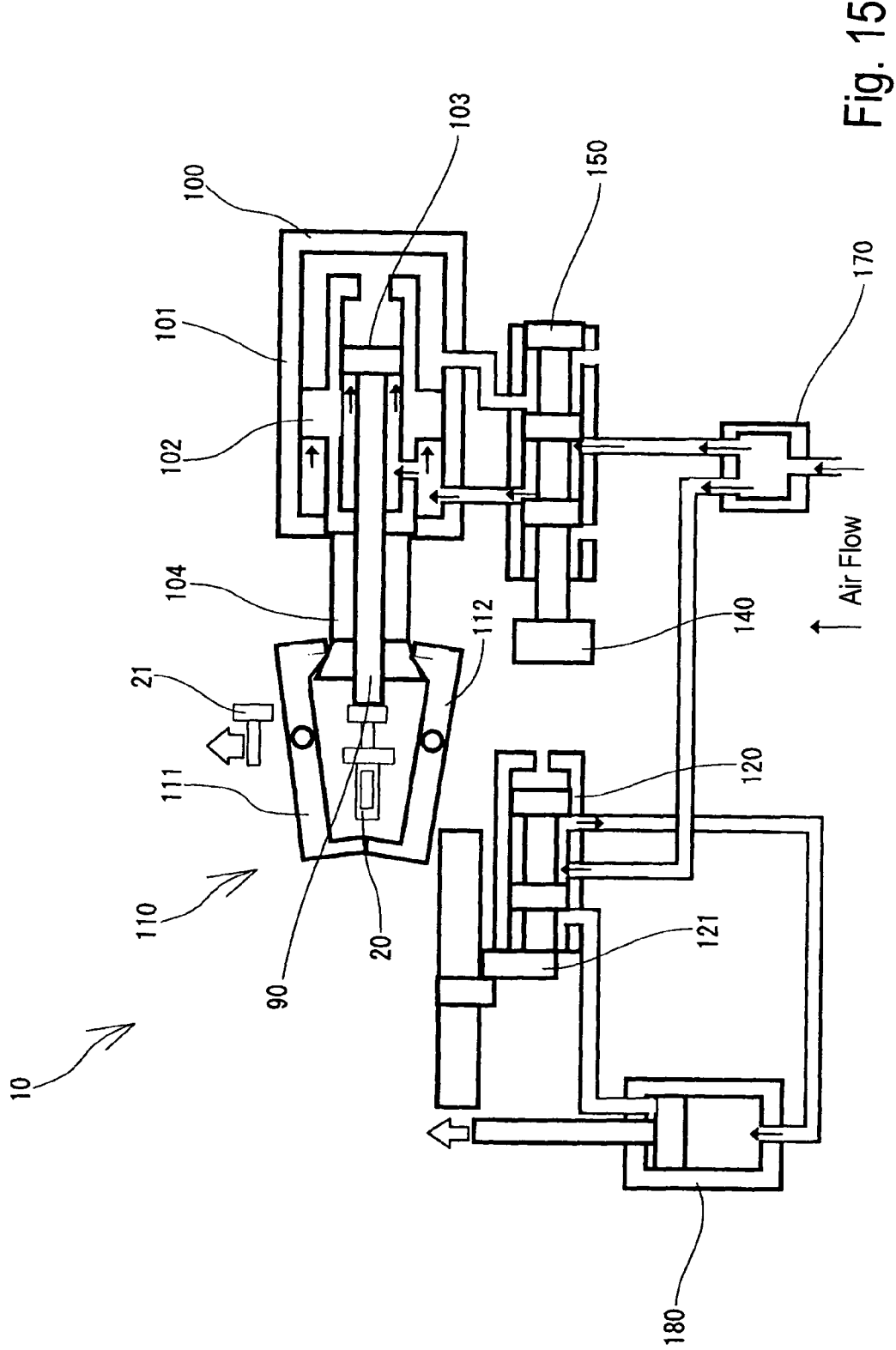
FIG. 15 is a pneumatic circuit diagram of each operating state with respect to FIG. 1.
Figure 17:
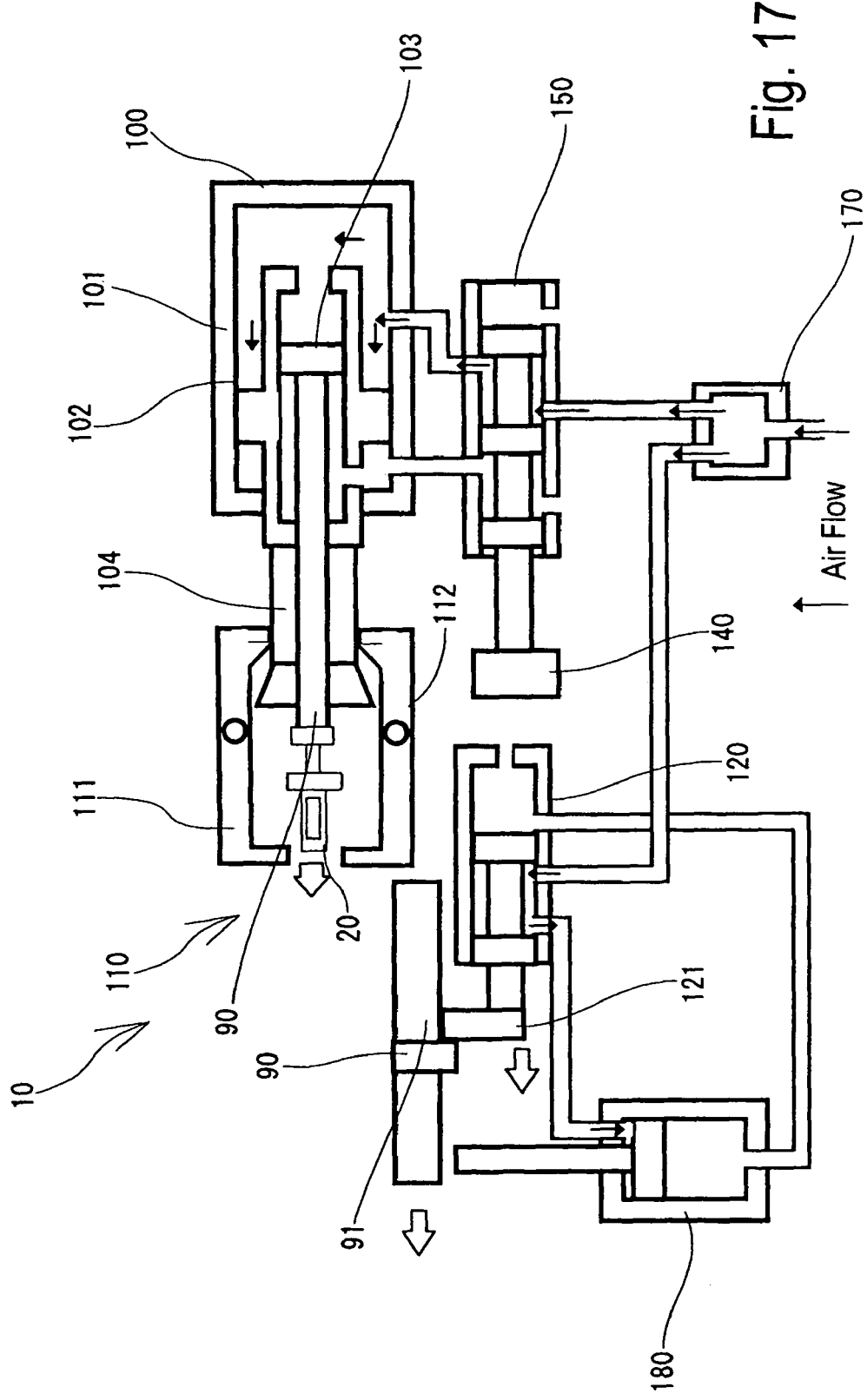
FIG. 17 is a pneumatic circuit diagram of each operating state with respect to FIG. 1.
Figure 18:
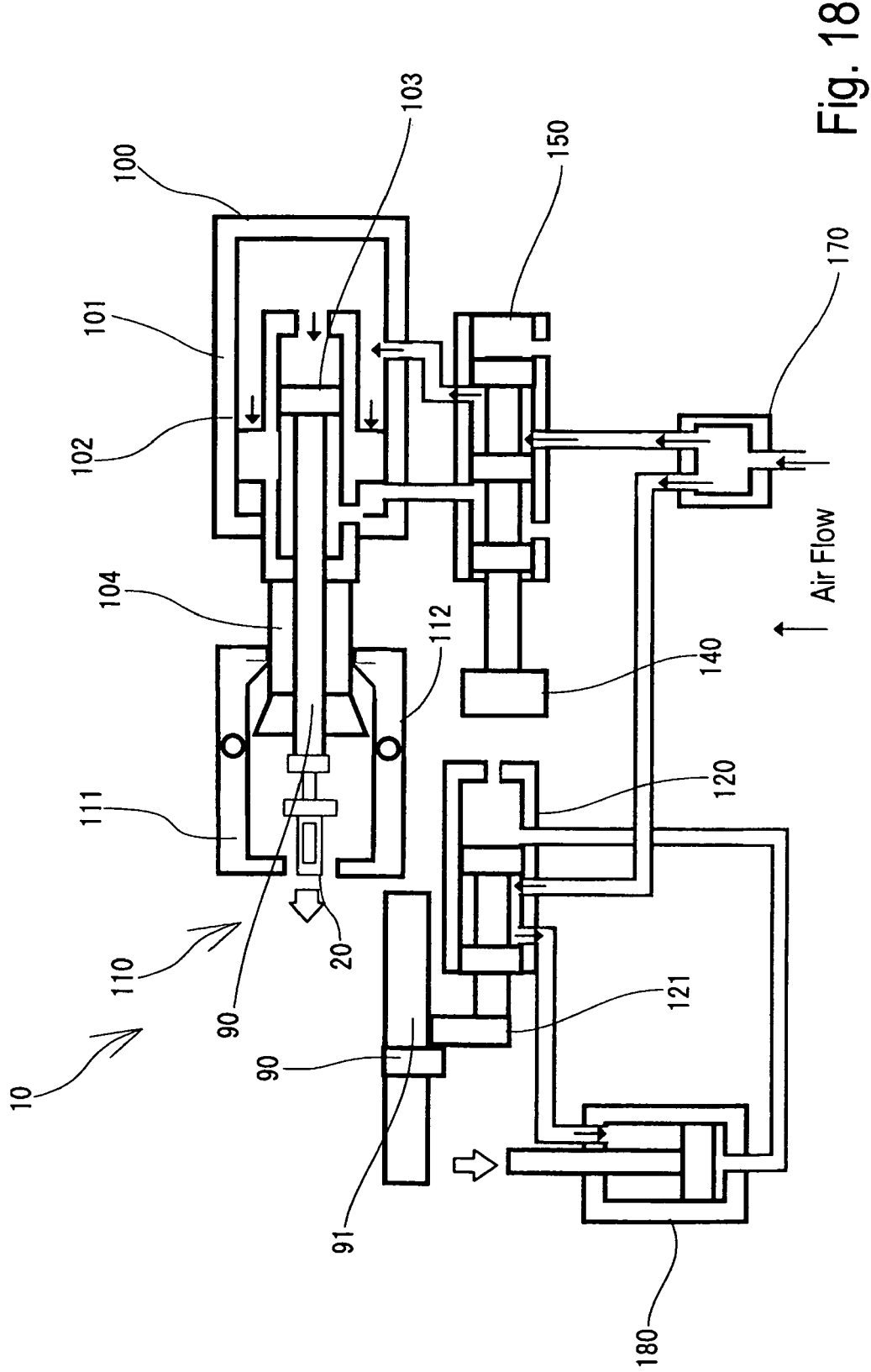
FIG. 18 is a pneumatic circuit diagram of each operating state with respect to FIG. 1.

Specifically, as shown in FIG. 1, the switching valve 120 is located in an air supply route which reaches the supplying actuator 180 described hereinafter. When the head portion 81 of the rivet 20 is transferred in the direction of being pulled out, the switching valve 120 is switched by the supplying actuator 180. Usually, i.e., when the rivet 20 is supplied as shown in FIG. 15, the supplying actuator 180 is urged in a transfer direction, and as shown in FIGS. 17, 18, due to the switching operation of the switching valve, the supplying actuator 180 returns in a counter-transfer direction.

As shown in FIG. 1, the cylinder of the switching valve 120 includes one input port and two exit ports. Among the two exit ports, one is located on the head side and the other is located on the rod side. The input port is located in the middle of the output port on the head side and the output port on the rod side.

As shown in FIG. 1, in the initial state, the pistons are located on the rod side of the cylinder, and the air pressure flows to the input port and the output port on the rod side. As shown in FIGS. 14, 15, after the switching operation, the pistons slide to the head side of the cylinder and the air pressure flows from the input port to the output port on the head side.

As shown in FIG. 1, the switching valve 120 includes the following parts.

Incidentally, the parts of the switching valve 120 are not limited to the following (1).

(1) Switching shaft 121

As shown in FIG. 1, one end portion of the switching shaft 121 is fitted into the switching groove 91 of the main shaft 90, and the other end portion of the switching shaft 121 is connected to a piston rod of the switching valve 120.

As shown in FIG. 14, when the main shaft 90 moves backward, the switching shaft 121 is pushed by the end face of the switching groove 91, and the pistons slide toward the head side of the cylinder, so that the switching valve 120 is switched.

(Reversal Control Means 130)

As shown in FIGS. 9, 10, a reversal control means 130 projects into the discharge passage 31, and controls the remaining portion 21 to return to the loaded position A.

As shown in FIGS. 9, 10, the reversal control means 130 includes the following parts.

Incidentally, the parts of the reversal control means 130 are not limited to the following (1) to (2).

(1) Plunger 131

A plunger 131 is supported inside the discharge passage 31 to be able to move forward and backward.

(2) Urging means (not shown)

An urging means (not shown) urges the plunger 131 in a direction that the plunger 131 projects into the discharge passage 31, and is configured by, for example, a spring and the like.

As shown in FIG. 15, if the remaining portion 21 which was cut off from the rivet 20 is positioned in the loaded position A, when the new rivet 20 is supplied in the loaded position A by the supplying actuator 180, the remaining portion 21 is pushed by the new rivet 20 and pushed out toward the inside of the discharge passage 31.

At this time, the plunger 131 is pushed by the remaining portion 21, and recedes against an urging force of the urging means once (not shown). When the remaining portion 21 passes the plunger 131, the plunger 131 projects into the discharge passage 31 again due to a restoring force of the urging means, so that the remaining portion 21 is prevented from returning to the loaded position A through the discharge passage 31.

(Operating Lever 140)

As shown in FIGS. 1 to 4, the operating lever 140 is formed like a trigger; connected to the piston of the trigger valve 150; and activates the implanting operation of the rivet 20 loaded in the air tool 10.

(Trigger Valve 150)

As shown in FIG. 1, the trigger valve 150 includes the piston connected to the operating lever 140, and switches flow passages of the two output ports by sliding the piston to the head side by pushing the operating lever 140 in.

The cylinder of the trigger valve 150 includes one input port and two output ports. Among the two output ports, one is positioned on the head side and the other is positioned on the rod side.

The input port is connected to one of the two output ports of the divergent joint 170 described hereinafter. The output port on the head side is connected to the input port on the head side of the main cylinder 101. The output port on the rod side is connected to the input port on the rod side of the main cylinder 101.

As shown in FIG. 1, in the trigger valve 150, in the initial state wherein the operating lever 140 is not operated, the air pressure flows from the input port to the input port on the rod side.

As shown in FIG. 11, when the operating lever 140 is operated, the flow of the air pressure is switched and the air pressure flows from the input port to the input port on the head side.

(Hose Connecting Portion 160)

A hose connecting portion 160 connects a hose for supplying air (not shown).

(Divergent Joint 170)

As shown in FIG. 1, the divergent joint 170 divides the air supplied through the hose connecting portion 160 into two directions.

The divergent joint 170 includes one input port and two output ports.

The input port is connected to the hose connecting portion 160. One of the two output ports is connected to the input port of the trigger valve 150. The other output port is connected to the input port on the rod side of the switching valve 120.

(Supplying Actuator 180)

As shown in FIGS. 2 to 4, the supplying actuator 180 loads the rivet row 60; tears off the fragile portion 83 of the very front-row rivet 20; and supplies it in the loaded position A. The rivets 20 supplied in the loaded position A is transferred to the implanted position B from the loaded position A by the implanting actuator 100 in a state wherein the head portions 81 are retained by the main shaft 90.

As shown in FIG. 1, the cylinder of the supplying actuator 180 includes one input port on the head side and one input port on the rod side.

The input port on the head side is connected to the output port on the head side of the switching valve 120. The input port on the rod side is connected to the output port on the rod side of the switching valve 120.

In the supplying actuator 180, as shown in FIG. 1, in the initial state, the air pressure flows from the output port on the rod side of the switching valve 120 to the input port on the rod side of the supplying actuator 180, so that the piston slides toward the head side and moves downward.

On the other hand, as shown in FIGS. 14, 15, when the switching valve 120 is switched, the flow of the air pressure moves from the output port on the head side of the switching valve 120 to the input port on the head side of the supplying actuator 180, so that the piston slides toward the rod side and moves upward.

(Supplying Mechanism 190)

As shown in FIGS. 9, 10, the supplying mechanism 190 is connected to the piston rod of the supplying actuator 180, and supplies the very front-row rivet 20 of the rivet row 60 one by one in the loaded position A.

Specifically, the supplying mechanism 190 includes the following parts.

(1) Slider 191

The lower end portion of a slider 191 is connected to the piston rod, and the slider 191 is supported to be movable upward and downward.

(2) Powell 192

A Powell 192 is supported at the top end portion of the slider 191 to be rotatable, and extends in a sharp-pointed beak shape toward the inside of the interval between the adjacent head portions 81 of the rivet row 60.

Specifically, the Powell 192 enters between the head portion 81 of the very front-row rivet 20 and the head portion 81 of the second-row rivet 20, and when the slider 191 moves upward, the Powell 192 pushes the very front-row rivet 20 out in the loaded position A. Next, when the slider 191 moves downward, the Powell 192 moves downward while rotating by being pushed by the head portion 81 of the second-row rivet 20, and enters between the head portion 81 of the second-row rivet 20 and the head portion 81 of the third-row rivet 20.

(Housing Case 200)

On the other hand, as shown in FIGS. 27, 28, in the discharge passage 31 of the main body portion 30, a housing means, which can house the remaining portions 21 of the rivets 20 discharged through the discharge passage 31, is provided.

As the housing means, a housing case 200 with a hollow box shape can be attached to the upper surface of the main body portion 30 to be attachable and detachable.

The bottom face of the housing case 200 includes a bore (not shown) communicated with the discharge passage 31. Also, the housing case 200 is formed in the hollow box shape whose upper surface is open and an opening-and-closing lid 201 is attached on the front face of the opening to be openable and closable.

On the other hand, a number of case attachment portions 32 which project toward the upper side are provided on the top face of the main body portion 30, and can fix the housing case 200 through the case attachment portions 32.

Incidentally, for the housing means, the housing case 200 is shown as the example; however, the housing means is not limited to the housing case 200, and may be, for example, saclike.

(Explanation of Operation)

Next, operation of the air tool 10 with the above-mentioned structure will be explained using pneumatic circuit diagrams shown in FIGS. 1, 11 to 20.

(Initial State in FIG. 1)

FIG. 1 is a pneumatic circuit diagram for explaining an initial state of the air tool 10.

The initial state is the time when the operating lever 140 is not operated.

At this time, the rivets 20 are already loaded, and the head portions 81 are retained in the front end portion of the main shaft 90.

The rivets 20 are transferred to the implanted position B, and as shown in FIG. 4, the female members 70 project in front of the cutter device 110 in an open state. At this time, the shaft portions 82 of the rivets 20 are positioned in the interval between the upper and lower cutter pieces 111, 112.

The flow of air to the implanting actuator 100 is as follows.

The divergent joint 170→the output port on the head side of the trigger valve 150→the input port on the head side of the main cylinder 101→the input port on the head side of the outer piston 102.

Both the outer piston 102 and the inner piston 103 of the implanting actuator 100 slide to the rod side and are situated in the forefront position, and the main shaft 90 is also situated in the forefront position.

The flow of air to the supplying actuator 180 is as follows.

The divergent joint 170→the output port on the rod side of the switching valve 120→the input port on the rod side of the supplying actuator 180.

The piston of the supplying actuator 180 slides to the head side, and is located in a downward position.

(Operating Time of Operating Lever 140 in FIG. 11)

FIG. 11 is the pneumatic circuit diagram for explaining a state of the operating time of the operating lever 140.

First, as shown in FIG. 4, the leg portions 72 of the rivets 20 projecting in front of the cutter device 110 in the open state are inserted into the attachment bores H of the panels P (not shown) (refer to FIG. 25).

Subsequently, the operating lever 140 will be pulled with one's fingers.

When the operating lever 140 is operated, the piston of the trigger valve 150 slides to the head side of the cylinder and moves backward.

When the piston moves backward, the flow of air to the implanting actuator 100 is switched as follows.

The divergent joint 170→the output port on the rod side of the trigger valve 150→the input port on the rod side of the main cylinder 101→the input port on the rod side of the outer piston 102.

The outer piston 102 moves backward, and the slide cam 104 connected to the outer piston 102 moves backward. At this time, due to the backward movement of the slide cam 104, a depression and projection of the slide cam 104 and the main shaft 90 are engaged (not shown), so that the main shaft 90 interlocks and moves backward.

The flow of air to the supplying actuator 180 is the same as the initial state in FIG. 1.

Figure 12:
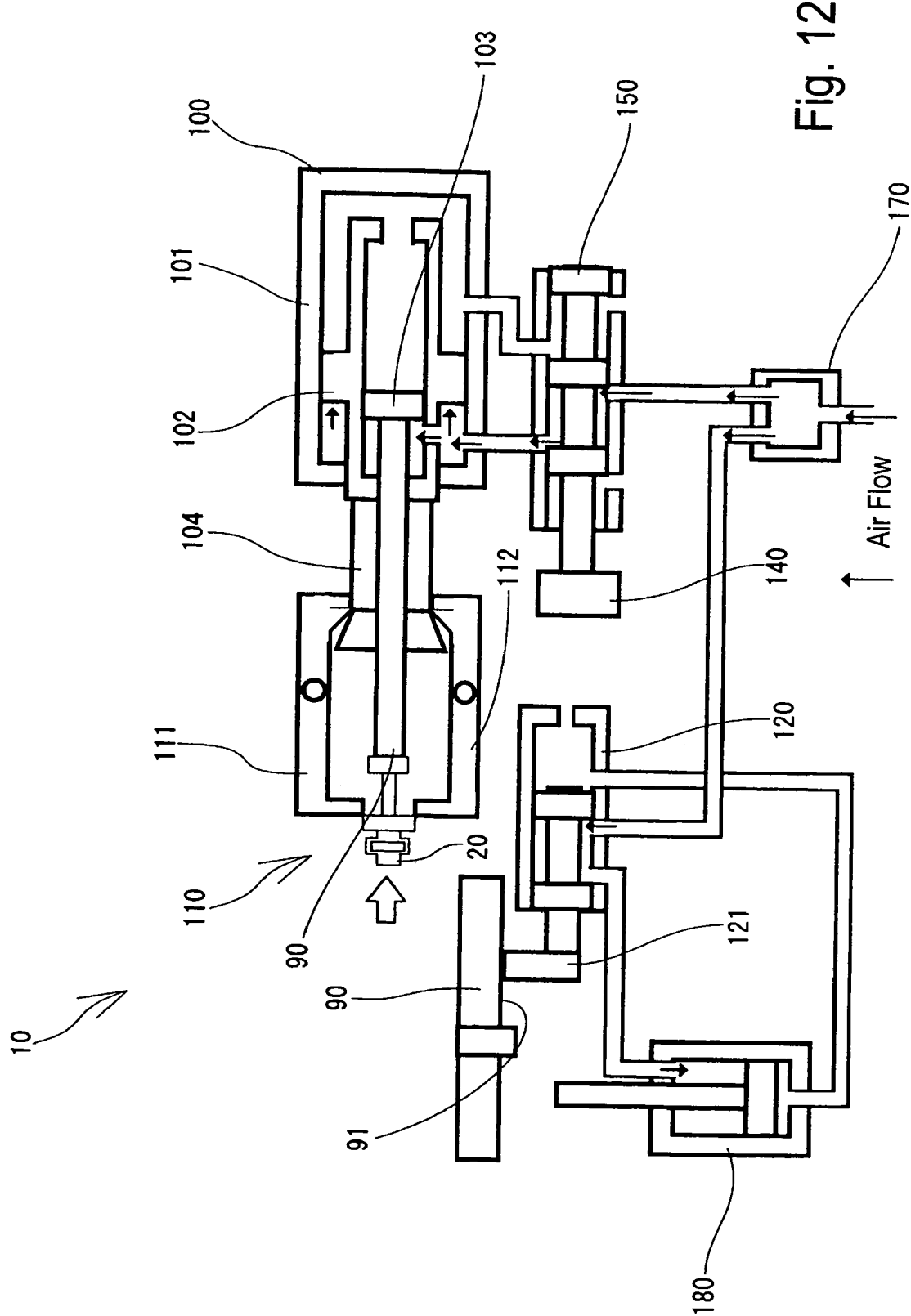
FIG. 12 is a pneumatic circuit diagram of each operating state with respect to FIG. 1.

(Fastening Time of Rivet 20 in FIG. 12)

FIG. 12 is the pneumatic circuit diagram for explaining a state of the fastening time of the rivet 20.

When the main shaft 90 moves backward, as shown in FIGS. 12, 25, the rivet 20 is firmly tightened.

Specifically, the base portion 71 of the female member 70 projecting from the cutter device 110 in the open state hits the end faces of the front end portions of the upper and lower cutter pieces 111, 112, so that the base portion 71 is prevented from moving backward. As a result, the shaft portion 82 of the male member 80 is pulled out of the communicating bore 73 of the female member 70, so that, as shown in FIG. 25, the leg portion 72 expands the diameter on the back side of the panels P.

When the leg portion 72 expands the diameter on the back side of the panels P, the main shaft 90 cannot move backward any more, so that the main shaft 90 stops moving backward.

(Cutting Time of Rivet 20 in FIG. 13)

FIG. 13 is the pneumatic circuit diagram for explaining a state wherein the rivet 20 is cut off.

After the main shaft 90 stops moving backward, the slide cam 104 tries to move backward further. At this time, the depression and projection of the slide cam 104 and the main shaft 90 are disengaged (not shown), so that the slide cam 104 moves backward independently.

When the slide cam 104 moves backward, the cam portion thereof engages the engagement faces of the upper and lower cutter pieces 111, 112, and the cutter device 110 is closed.

When the cutter device 110 is closed, as shown in FIG. 26, the shaft portion 82 of the rivet 20 is cut off.

When the shaft portion 82 of the rivet 20 is cut off, one portion of the shaft portion 82 of the female member 70 and the male member 80 remains in the attachment bores H of the panels P.

At the same time, when the shaft portion 82 of the rivet 20 is cut off, the main shaft 90 can move backward.

(Backward Movement Time of Main Shaft 90 in FIG. 14)

FIG. 14 is the pneumatic circuit diagram for explaining a state wherein the main shaft 90 moves backward.

When the main shaft 90 can move backward, the main shaft 90 moves backward with the backward movement of the inner piston 103.

With the backward movement of the main shaft 90, the remaining portion 21 of the rivet 20 moves from the implanted position B to the loaded position A.

At the same time, when the main shaft 90 moves backward, the switching shaft 121 of the switching valve 120 is pushed by the end face of the switching groove 91, so that the switching valve 120 is switched.

When the switching valve 120 is switched, the flow of air to the supplying actuator 180 is switched as follows.

The divergent joint 170→the output port on the head side of the switching valve 120→the input port on the head side of the supplying actuator 180.

(Supplying Time and Discharging Time of Rivet 20 in FIG. 15)

FIG. 15 is the pneumatic circuit diagram for explaining a state wherein the rivet 20 is supplied and discharged.

When the switching valve 120 is switched, the piston of the supplying actuator 180 slides toward the rod side and moves upward.

When the piston of the supplying actuator 180 moves upward, the forehand rivet 20 is supplied in the loaded position A by the supplying mechanism 190.

At this time, the remaining portion 21 of the rivet 20 which has remained in the loaded position A is pushed by the newly supplied rivet 20; comes off from the front end portion of the main shaft 90; and is pushed into the discharge passage 31 from the loaded position A.

The reverse movement to the loaded position A of the remaining portion 21 which was pushed into the discharge passage 31 is controlled by the reversal control means 130.

At the same time, the head portion 81 of the newly supplied rivet 20 is retained in the front end portion of the main shaft 90.

Figure 16:
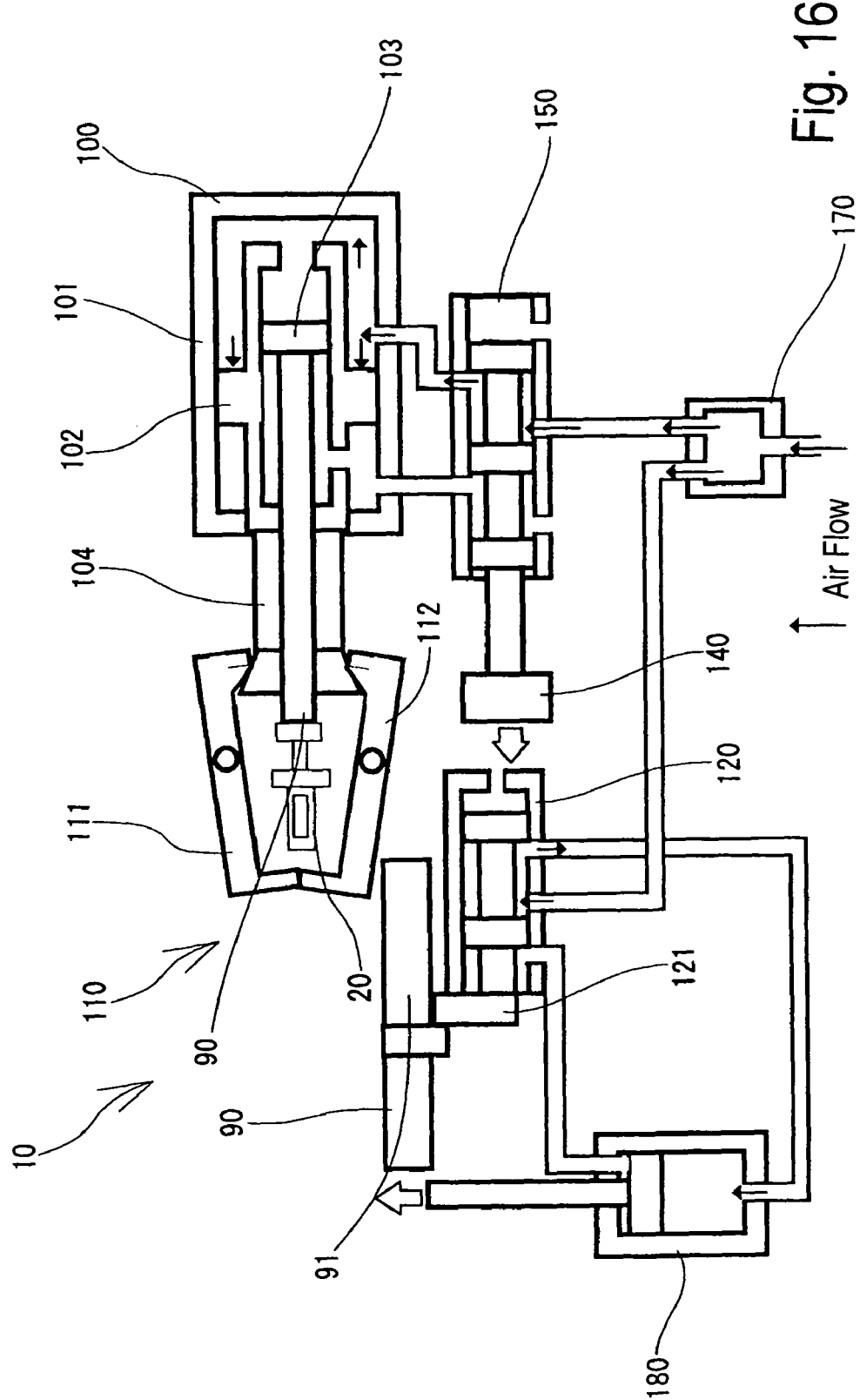
FIG. 16 is a pneumatic circuit diagram of each operating state with respect to FIG. 1.

(Open Time of Operating Lever 140 in FIG. 16)

FIG. 16 is the pneumatic circuit diagram for explaining the state wherein the operating lever 140 is open.

When a pulled force on the operating lever 140 by one's fingers is relieved, the operating lever 140 is restored to original state by an urging force such as a coil spring and the like (not shown). At this time, the piston of the trigger valve 150 slides toward the rod side of the cylinder and moves forward.

When the piston moves forward, the flow of air to the implanting actuator 100 returns to the initial state in FIG. 1, and is switched as follows.

The divergent joint 170→the output port on the head side of the trigger valve 150→the input port on the head side of the main cylinder 101→the input port on the head side of the outer piston 102.

When the trigger valve 150 is switched, the outer piston 102 moves forward.

(Forward Movement Time of Outer Piston 102 and Opening Time of Switching Valve 120 in FIG. 17)

FIG. 17 is a pneumatic circuit diagram for explaining the state wherein the outer piston 102 moves forward and the switching valve 120 is open.

When the outer piston 102 moves forward, the slide cam 104 connected to the outer piston 102 also moves forward.

When the slide cam 104 also moves forward, the cam portion thereof is disengaged from the engagement faces of the upper and lower cutter pieces 111, 112, so that the cutter device 110 is open.

When the slide cam 104 moves forward further, the depression and projection of the slide cam 104 and the main shaft 90 are engaged again (not shown), so that the main shaft 90 interlocks and moves forward.

When the main shaft 90 moves forward, the switching groove 91 moves, so that the switching shaft 121 of the switching valve 120 is open. The piston of the switching valve 120 moves forward again due to an urging force such as the coil spring and the like (not shown), and the switching valve 120 is switched.

When the switching valve 120 is switched, the flow of air to the supplying actuator 180 returns to the initial state in FIG. 1, and is switched as follows.

The divergent joint 170→the output port on the rod side of the switching valve 120→the input port on the rod side of the supplying actuator 180.

(Most Forward Time of Outer Piston 102 and Downward Time of Supplying Actuator 180 in FIG. 18)

FIG. 18 is the pneumatic circuit diagram for explaining the state wherein the outer piston 102 is moved the most forward, and the supplying actuator 180 is moved downward.

When the outer piston 102 moves forward, the inner piston 103 also moves forward, and the main shaft 90 moves forward further. At this time, the newly supplied rivet 20 moves forward from the loaded position A.

At this time, the fragile portion 83 of the newly supplied rivet 20 is torn off.

Also, when the switching valve 120 is switched, the flow of air to the supplying actuator 180 returns to the initial state in FIG. 1, and the supplying actuator 180 moves downward.

At this time, when the slider 191 moves downward, the Powell 192 of the supplying mechanism 190 moves downward while rotating by being pushed by the head portion 81 of the second-row rivet 20, and enters between the head portion 81 of the second-row rivet 20 and the head portion 81 of the third-row rivet 20.

Figure 19:
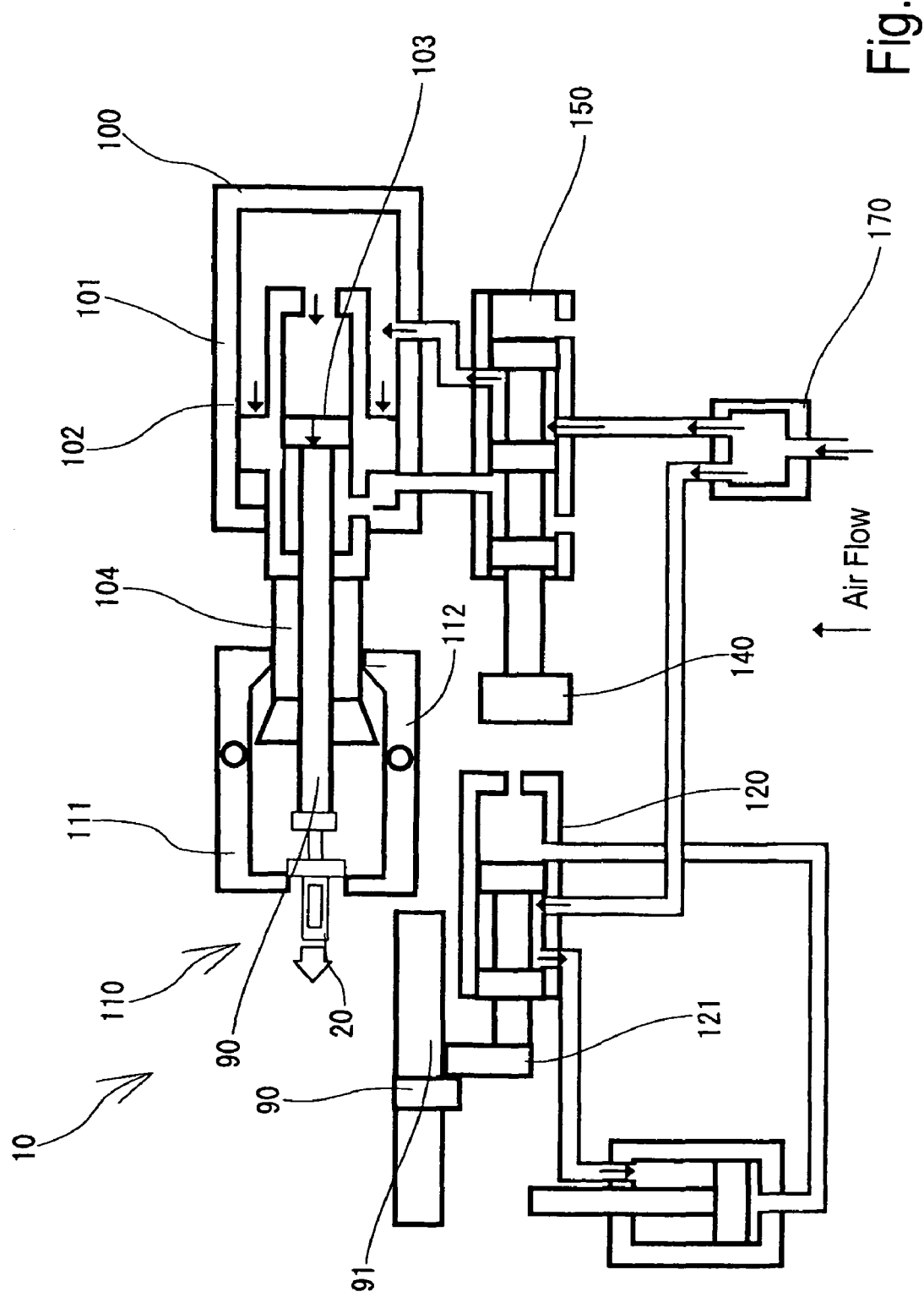
FIG. 19 is a pneumatic circuit diagram of each operating state with respect to FIG. 1.

(Forward Movement Time of Main Shaft 90 in FIG. 19)

FIG. 19 is the pneumatic circuit diagram for explaining the state wherein the main shaft 90 moves forward.

With the forward movement of the inner piston 103, the main shaft 90 moves forward, so that the newly supplied rivet 20 is moved forward further from the loaded position A.

Figure 20:
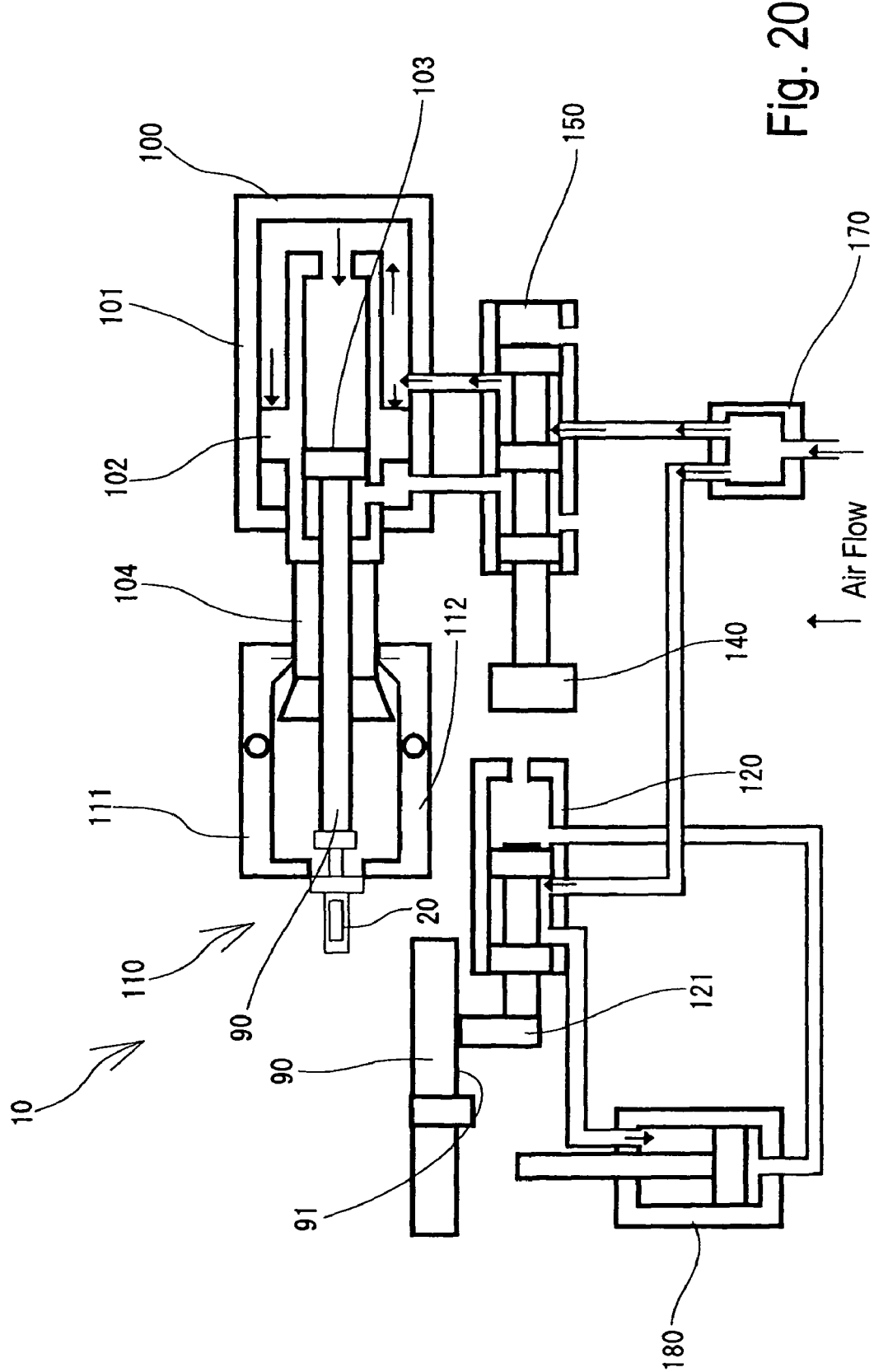
FIG. 20 is a pneumatic circuit diagram of each operating state with respect to FIG. 1.

(Most Forward Time of Main Shaft 90 and Initial State in FIG. 20)

FIG. 20 is the pneumatic circuit diagram for explaining the most forward time of the main shaft 90 and the initial state.

The main shaft 90 moves forward further; transfers the newly supplied rivet 20 from the loaded position A to the implanted position B; and returns to the initial state.

The disclosures of Japanese Patent Applications No. 2008-165487 filed on Jun. 25, 2008, No. 2008-165493 filed on Jun. 25, 2008 and No. 2008-165504 filed on Jun. 25, 2008 are incorporated in the application.

While the invention has been explained with reference to the specific embodiments of the invention, the explanation is illustrative and the invention is limited only by the appended claims.

What is claimed is:

1. A combination comprising a rivet fastening air tool and rivets,
    wherein each of the rivets comprises:
    a female member including a base portion, a leg portion extending from the base portion, the leg portion being adapted to be inserted in an attachment bore and bent on a rear face side of the attachment bore, and a communicating bore communicated from the base portion to the leg portion; and
    a male member including a head portion, and a shaft portion extending from the head portion, said shaft portion being held in the communicating bore to be able to pull outwardly from the female member so that the leg portion expands outwardly,
    said rivets being attached together to form a rivet row by connecting adjacent head portions through fragile portions such that the leg portions face a same direction, and
    wherein said rivet fasting air tool comprises:
    a supplying portion for receiving the rivet raw;
    a supplying actuator situated adjacent the supplying portion, the supplying actuator tearing off the fragile portion of a front-row rivet of the rivet row, and supplying it in a loaded position of the tool;
    an implanting actuator situated adjacent the supplying actuator, the implanting actuator holding the head portion of the rivet supplied in the loaded position, and moving the male member of the rivet in a direction of pulling the male member from the communicating bore of female member of the rivet;
    an air supply device having an air supply route which reaches the supplying actuator, and
    a switching valve provided in the air supply route, wherein when the head portion of the rivet is moved in the direction of being pulled out, the switching valve is switched by the implanting actuator so that the supplying actuator is returned.

2. A combination according to claim 1, wherein the supplying actuator is urged in a transfer direction, and returned in a counter-transfer direction by a switching operation of the switching valve.

3. A combination according to claim 1, wherein the switching valve is provided in the rivet implanting actuator.

4. A combination according to claim 1, further comprising a cutter device provided in the loaded position and having cutter pieces, the cutter pieces being opposed to each other in an open position, sandwiching the shaft portion of the rivet within an opposed interval, and cutting off the shaft portion in a closed position from the head portion, and wherein the implanting actuator comprises a main cylinder, an outer piston slidably housed inside the main cylinder, an inner piston slidably housed inside the outer piston, a main shaft fixed to the inner piston for holding the head portion, and a slide cam connected to the outer piston, said slide cam retaining the cutter device in the open position and moving the cutter device in the closed position by sliding of the outer piston.

5. A combination according to claim 4, wherein the supply actuator is arranged such that a remaining portion of the rivet which was cut off by the cutter device is transferred by a front-row rivet after the supplying actuator is returned so that the transferred rivet pushes the remaining portion of the rivet which was cut off by the cutter device into a discharge passage communicated with the loaded position.

6. A combination according to claim 1, wherein the rivet is made of resin.

7. A combination comprising a rivet fastening air tool and rivets,
wherein each of the rivets comprises:
a female member including a base portion, a leg portion extending from the base portion, the leg portion being adapted to be inserted in an attachment bore and bent on a rear face side of the attachment bore, and a communicating bore communicated from the base portion to the leg portion; and
a male member including a head portion, and a shaft portion extending from the head portion, said shaft portion being held in the communicating bore to be able to pull outwardly from the female member so that the leg portion expands outwardly,
said rivets being attached together to form a rivet row by connecting adjacent head portions through fragile portions such that the leg portions face a same direction, and
wherein said rivet fasting air tool comprises:
a supplying portion for receiving the rivet raw;
a supplying actuator situated adjacent the supplying portion, the supplying actuator tearing off the fragile portion of a front-row rivet of the rivet row, and supplying it in a loaded position of the tool;
an implanting actuator situated adjacent the supplying actuator, the implanting actuator holding the head portion of the rivet supplied in the loaded position, and moving the male member of the rivet in a direction of pulling the male member from the communicating bore of female member of the rivet; and
a cutter device located in the loaded position, said cutter device comprising a pair of cutter pieces which are axially held to be openable and closable, and an opening provided in at least one of the cutter pieces so that a front-row rivet transferred by the supplying actuator can pass through the opening,
wherein in an open position where both cutter pieces are spaced, the cutter pieces receive the front-row rivet passed through the opening and transferred by the supplying actuator; sandwich the shaft portion between the cutter pieces; and cut off the shaft portion from the head portion by cooperating with an operation of the implanting actuator and approximating the cutter pieces.

8. A combination according to claim 7, wherein the cutter pieces are positioned at a front side and a back side in a transfer direction of the rivet; the opening is provided in the cutter piece located at the back side; and in both sides of the opening which are orthogonal to the transfer direction of the rivets, a pair of bearings is independently provided to rotationally support shafts of the cutter piece located at the back side.

9. A combination according to claim 8, wherein the implanting actuator comprises a main cylinder, an outer piston slidably housed inside the main cylinder, an inner piston slidably housed inside the outer piston, a main shaft fixed to the inner piston for holding the head portion, and a slide cam connected to the outer piston, said slide cam retaining the cutter device in the open position and moving the cutter device in the closed position by sliding of the outer piston.

10. A combination according to claim 8, wherein the supply actuator is arranged such that a remaining portion of the rivet which was cut off by the cutter device is transferred by a front-row rivet after the supplying actuator is returned so that the transferred rivet pushes the remaining portion of the rivet which was cut off by the cutter device into a discharge passage communicated with the loaded position.

11. A combination comprising a rivet fastening air tool and rivets,
wherein each of the rivets comprises:
a female member including a base portion, a leg portion extending from the base portion, the leg portion being adapted to be inserted in an attachment bore and bent on a rear face side of the attachment bore, and a communicating bore communicated from the base portion to the leg portion; and
a male member including a head portion, and a shaft portion extending from the head portion, said shaft portion being held in the communicating bore to be able to pull outwardly from the female member so that the leg portion expands outwardly,
said rivets being attached together to form a rivet row by connecting adjacent head portions through fragile portions such that the leg portions face a same direction, and
wherein said rivet fasting air tool comprises:
a supplying portion for receiving the rivet raw;
a supplying actuator situated adjacent the supplying portion, the supplying actuator tearing off the fragile portion of a front-row rivet of the rivet row, and supplying it in a loaded position of the tool;
an implanting actuator situated adjacent the supplying actuator, the implanting actuator holding the head portion of the rivet supplied in the loaded position, and moving the male member of the rivet in a direction of pulling the male member from the communicating bore of female member of the rivet;
a cutter device located in the loaded position, and cutting off the shaft portion of the rivet after being fastened;
a discharge passage arranged adjacent the cutter device and discharging a remaining portion of the rivet which was cut off by the cutter device to an outside; and
a reversal control device projecting into the discharge passage, and preventing the remaining portion to return to the loaded position.

12. A combination according to claim 11, wherein the reversal control device includes a plunger disposed at the discharge passage to be able to move into or out of the discharge passage, and an urging device for urging the plunger in a direction of projecting into the discharge passage.

13. A combination according to claim 11, wherein the discharge passage has a housing device which houses the remaining portion of the rivet discharged through the discharge passage.

14. A combination according to claim 13, wherein the housing device includes a housing case with a hollow box shape and the housing case is detachably attached to an exit of the discharge passage.

* * * * *